United States Patent
Xie

(10) Patent No.: US 10,624,043 B2
(45) Date of Patent: Apr. 14, 2020

(54) METHOD FOR ADJUSTING RADIO-FREQUENCY POWER, ZIGBEE ROUTER, SENSOR AND SYSTEM

(71) Applicant: ZTE CORPORATION, Shenzhen, Guangdong Province (CN)

(72) Inventor: Zhongkun Xie, Shenzhen (CN)

(73) Assignee: ZTE CORPORATION (CN)

( * ) Notice: Subject to any disclaimer, the term of this patent is extended or adjusted under 35 U.S.C. 154(b) by 0 days.

(21) Appl. No.: 15/999,252

(22) PCT Filed: Jul. 25, 2016

(86) PCT No.: PCT/CN2016/091622
§ 371 (c)(1),
(2) Date: Aug. 17, 2018

(87) PCT Pub. No.: WO2017/140090
PCT Pub. Date: Aug. 24, 2017

(65) Prior Publication Data
US 2019/0110258 A1    Apr. 11, 2019

(30) Foreign Application Priority Data
Feb. 17, 2016 (CN) .......................... 2016 1 0089050

(51) Int. Cl.
*H04W 52/04* (2009.01)
*H04W 52/02* (2009.01)
(Continued)

(52) U.S. Cl.
CPC ........... *H04W 52/245* (2013.01); *H04W 4/80* (2018.02); *H04W 52/0216* (2013.01);
(Continued)

(58) Field of Classification Search
CPC . Y02D 70/10; Y02D 70/162; H04W 52/0216; H04W 52/0245; H04W 52/245;
(Continued)

(56) References Cited

U.S. PATENT DOCUMENTS

| | | | |
|---|---|---|---|
| 2010/0091745 A1* | 4/2010 | Bevan | H04W 24/02 370/338 |
| 2013/0102309 A1* | 4/2013 | Chande | H04W 52/244 455/435.1 |

(Continued)

FOREIGN PATENT DOCUMENTS

| | | |
|---|---|---|
| CN | 102150451 A | 8/2011 |
| CN | 102932894 A | 2/2013 |

(Continued)

OTHER PUBLICATIONS

Translation of Office Action dated Mar. 15, 2019; Chinese Patent Application No. 201610089050.0.

(Continued)

*Primary Examiner* — Paul H Masur
(74) *Attorney, Agent, or Firm* — McDonald Hopkins LLC

(57) ABSTRACT

Provided are a method for adjusting a radio frequency power, a ZigBee router, a sensor, and a system. The method includes: determining a position state of a ZigBee sensor; creating a radio frequency power adjustment command message corresponding to the ZigBee sensor according to the position state of the ZigBee sensor; sending, to the ZigBee sensor, the radio frequency power adjustment command message corresponding to the ZigBee sensor; and determining a target radio frequency power, suitable for the ZigBee sensor, in a communication region according to a radio frequency power adjustment response message received from the ZigBee sensor.

16 Claims, 12 Drawing Sheets

(51) Int. Cl.
    *H04W 52/24* (2009.01)
    *H04W 4/80* (2018.01)
    *H04W 52/28* (2009.01)
    *H04W 84/18* (2009.01)
(52) U.S. Cl.
    CPC ..... *H04W 52/0245* (2013.01); *H04W 52/283* (2013.01); *H04W 84/18* (2013.01); *Y02D 70/10* (2018.01)
(58) Field of Classification Search
    CPC ....... H04W 52/283; H04W 4/38; H04W 4/80; H04W 84/18
    See application file for complete search history.

(56) References Cited

U.S. PATENT DOCUMENTS

| | | | | |
|---|---|---|---|---|
| 2014/0141769 | A1* | 5/2014 | Brisebois | H04W 36/14 455/424 |
| 2014/0227974 | A1 | 8/2014 | Perkins et al. | |
| 2016/0080107 | A1* | 3/2016 | Girouard | A61B 5/0004 600/546 |
| 2016/0135132 | A1* | 5/2016 | Donepudi | H04W 4/025 370/311 |
| 2017/0332188 | A1* | 11/2017 | Hamilton | H04B 5/0031 |
| 2018/0092042 | A1* | 3/2018 | Xu | H04W 4/00 |

FOREIGN PATENT DOCUMENTS

| | | | |
|---|---|---|---|
| CN | 103630876 | A * | 3/2014 |
| CN | 103630876 | A | 3/2014 |
| CN | 104540193 | A | 4/2015 |
| WO | 2015054489 | A | 4/2015 |

OTHER PUBLICATIONS

European Search Report dated Dec. 12, 2018; European Patent Application No. 16890318.5.

* cited by examiner

METHOD FOR ADJUSTING RADIO-FREQUENCY POWER, ZIGBEE ROUTER, SENSOR AND SYSTEM

TECHNICAL FIELD

The present disclosure relates, but not limited to, the technical field of ZigBee.

BACKGROUND

ZigBee is a short-range wireless communication technology, mainly used for data transmission between various electronic devices with short range, low power consumption and low transmission rate, and application with typical periodic data, intermittent data and low-reaction time data transmission. The ZigBee has been widely used in the Internet of Things industry chain, such as smart home, industrial automation, smart grid and other fields. A ZigBee network is composed of a ZigBee router and a ZigBee terminal, and the ZigBee sensor corresponds to the ZigBee terminal in the ZigBee network.

The ZigBee sensor is generally supplied with power from a battery carried therein. The ZigBee sensor has a variety of installation environments, and the battery cannot be replaced frequently. Therefore, it is necessary to reduce the energy consumption of the ZigBee sensor under the premise of ensuring the normal operation of the ZigBee sensor. The energy consumption of the ZigBee sensor is mainly the consumption of a radio frequency module. The ZigBee sensor in the related art transmits data at a fixed maximum transmission power regardless of the distance from the ZigBee router. When the distance between the ZigBee sensor and the ZigBee router is relatively small, data can also be transmitted to the ZigBee router without using a maximum transmission power. Therefore, the technical solution of transmitting, by a ZigBee sensor, data in the related art will increase the power consumption of the ZigBee sensor and reduce the working efficiency.

SUMMARY

The following is a brief introduction for a subject described herein in detail. The brief introduction is not intended to restrict the scope of protection of claims.

Provided are a method for adjusting a radio frequency power, a ZigBee router, a sensor, and a system, so as to reduce the power consumption of a ZigBee sensor, thereby prolonging the working period of the ZigBee sensor and improving the working efficiency.

A method for adjusting a radio frequency power is applied to a ZigBee router. The method includes:
determining a position state of a ZigBee sensor;
creating a radio frequency power adjustment command message corresponding to the ZigBee sensor according to the position state of the ZigBee sensor;
sending, to the ZigBee sensor, the radio frequency power adjustment command message corresponding to the ZigBee sensor; and
determining a target radio frequency power, suitable for the ZigBee sensor, in a communication region according to a radio frequency power adjustment response message received from the ZigBee sensor.

In an exemplary embodiment, in the above solution, the step of determining a position state of a ZigBee sensor includes:

receiving multiple first data messages sent by the ZigBee sensor within a first period; acquiring first Received Signal Strength Indication (RSSI) values of the multiple first data messages; and
determining a position state of the ZigBee sensor according to a fluctuation range of the multiple first RSSI values and the range of a first preset threshold.

In an exemplary embodiment, in the above solution, the step of creating a radio frequency power adjustment command message corresponding to the ZigBee sensor according to the position state of the ZigBee sensor includes:
creating, when the position state of the ZigBee sensor is a moving state, a radio frequency power adjustment command message of the moving state of the ZigBee sensor; and
creating, when the position state of the ZigBee sensor is a fixed state, a radio frequency power adjustment command message of the fixed state of the ZigBee sensor.

In an exemplary embodiment, in the above solution, the step of determining a position state of the ZigBee sensor according to a fluctuation range of the multiple first RSSI values and the range of a first preset threshold includes:
judging whether the fluctuation range of the multiple first RSSI values is within the range of the first preset threshold;
determining, when it is determined that the fluctuation range of the multiple first RSSI values is within the range of the first preset threshold, the position state of the ZigBee sensor as a fixed state; and
determining, when it is determined that the fluctuation range of the multiple first RSSI values is not within the range of the first preset threshold, the position state of the ZigBee sensor as a moving state.

In an exemplary embodiment, in the above solution, the step of creating, when the position state of the ZigBee sensor is a moving state, a radio frequency power adjustment command message corresponding to the moving state of the ZigBee sensor includes:
receiving a second data message sent by the ZigBee sensor within a second period;
acquiring a second RSSI value of the second data message;
dividing the communication region into multiple first intervals according to the multiple first RSSI values, each first interval corresponding to the range of a different first RSSI value;
determining, according to the second RSSI value and the range of different first RSSI values, a second interval of the second RSSI value in each first interval;
creating a radio frequency power adjustment command message of the moving state of the ZigBee sensor in each second interval;
or,
the step of creating, when the position state of the ZigBee sensor is a fixed state, a radio frequency power adjustment command message of the fixed state of the ZigBee sensor includes:
receiving a second data message sent by the ZigBee sensor within a second period;
acquiring a second RSSI value of the second data message;
dividing the communication region into a third interval according to the multiple first RSSI values, the third interval corresponding to the range of all first RSSI values;
determining that, according to the second RSSI value and the range of all first RSSI values, the second RSSI value is in the third interval; and creating a radio frequency power adjustment command message of the fixed state of the ZigBee sensor in the third interval.

In an exemplary embodiment, in the above solution, the step of sending, to the ZigBee sensor, the radio frequency power adjustment command message corresponding to the ZigBee sensor includes:

sending, when the position state of the ZigBee sensor is a moving state, a radio frequency power adjustment command message of the moving state of the ZigBee sensor in each second interval to the ZigBee sensor; and sending, when the position state of the ZigBee sensor is a fixed state, a radio frequency power adjustment command message of the fixed state of the ZigBee sensor in the third interval to the ZigBee sensor.

In an exemplary embodiment, in the above solution, after sending, to the ZigBee sensor, the radio frequency power adjustment command message corresponding to the ZigBee sensor, the method further includes:

receiving a power test request message of each level of radio frequency power sent by the ZigBee sensor;

obtaining an RSSI value of the power test request message of each level of radio frequency power according to the power test request message of each level of radio frequency power;

encapsulating the RSSI value of the power test request message of each level of radio frequency power into a power test response message of each level of radio frequency power; and sending the power test response message of each level of radio frequency power to the ZigBee sensor.

In an exemplary embodiment, in the above solution, the step of determining a target radio frequency power, suitable for the ZigBee sensor, in a communication region according to a radio frequency power adjustment response message received from the ZigBee sensor includes:

receiving the radio frequency power adjustment response message sent by the ZigBee sensor;

obtaining, when the position state of the ZigBee sensor is a moving state, a target radio frequency power of each second interval according to the radio frequency power adjustment response message, selecting a target radio frequency power with a maximum power value from the target radio frequency power of each second interval, and determining the selected target radio frequency power with the maximum power value as a target radio frequency power of the ZigBee sensor in the communication region; and obtaining, when the position state of the ZigBee sensor is a fixed state, the target radio frequency power according to the radio frequency power adjustment response message, and determining the target radio frequency power as a target radio frequency power of the ZigBee sensor in the communication region.

A method for adjusting a radio frequency power, applied to a ZigBee sensor, includes:

receiving a radio frequency power adjustment command message sent by a ZigBee router and corresponding to the ZigBee sensor;

determining, according to the received radio frequency power adjustment command message, a target radio frequency power of the ZigBee sensor under a current position state; and sending, to the ZigBee router, a radio frequency power adjustment response message carrying the target radio frequency power of the ZigBee sensor under the current position state.

In an exemplary embodiment, in the above solution, before receiving a radio frequency power adjustment command message sent by a ZigBee router and corresponding to the ZigBee sensor, the method further includes:

sending multiple first data messages to the ZigBee router within a first period.

In an exemplary embodiment, in the above solution, after sending multiple first data messages to the ZigBee router within a first period, the method further includes:

sending a second data message to the ZigBee router within a second period.

In an exemplary embodiment, in the above solution, the step of receiving a radio frequency power adjustment command message sent by a ZigBee router and corresponding to the ZigBee sensor includes:

receiving a radio frequency power adjustment command message sent by the ZigBee router and corresponding to a moving state of the ZigBee sensor or a radio frequency power adjustment command message of a fixed state corresponding to the ZigBee sensor.

In an exemplary embodiment, in the above solution, the step of determining, according to the radio frequency power adjustment command message, a target radio frequency power of the ZigBee sensor under a current position state includes:

setting a first threshold according to the radio frequency power adjustment command message of the ZigBee sensor under a moving state;

setting N levels of radio frequency power according to the value ranges of a radio frequency power with a maximum power value and a radio frequency power with a minimum power value, wherein N is a positive integer greater than or equal to 3;

sending a power test request message of each level of radio frequency power to the ZigBee router;

receiving a power test response message of each level of radio frequency power sent by the ZigBee router;

obtaining an RSSI value of the power test request message of each level of radio frequency power according to the power test response message of each level of radio frequency power;

determining a specific level of radio frequency power meeting conditions by using a dichotomy method and the first threshold according to the RSSI value of the power test request message of each level of radio frequency power;

determining the specific level of radio frequency power meeting conditions as a target radio frequency power of the ZigBee sensor under the moving state;

Or, setting a second threshold according to the radio frequency power adjustment command message of the ZigBee sensor under a fixed state;

setting M levels of radio frequency power according to the value ranges of a radio frequency power with a maximum power value and a radio frequency power with a minimum power value, wherein M is a positive integer greater than or equal to 3;

sending a power test request message of each level of radio frequency power to the ZigBee router;

receiving a power test response message of each level of radio frequency power sent by the ZigBee router;

obtaining an RSSI value of the power test request message of each level of radio frequency power according to the power test response message of each level of radio frequency power;

determining a specific level of radio frequency power meeting conditions by using a dichotomy method and the second threshold according to the RSSI value of the power test request message of each level of radio frequency power; and determining the specific level of radio frequency power meeting conditions as a target radio frequency power of the ZigBee sensor under the fixed state.

A ZigBee router includes:

a determination module, arranged to: determine a position state of a ZigBee sensor;

a creation module, arranged to: create a radio frequency power adjustment command message corresponding to the ZigBee sensor according to the position state of the ZigBee sensor determined by the determination module;

a communication module, arranged to: send, to the ZigBee sensor, the radio frequency power adjustment command message created by the creation module and corresponding to the ZigBee sensor; and a processing module, arranged to: determine a target radio frequency power, suitable for the ZigBee sensor, in a communication region according to a radio frequency power adjustment response message received by the communication module from the ZigBee sensor.

In an exemplary embodiment, in the above solution, the communication module is further arranged to: receive multiple first data messages sent by the ZigBee sensor within a first period;

the determination module is further arranged to: acquire first RSSI values of the multiple first data messages received by the communication module; and determine a position state of the ZigBee sensor according to a fluctuation range of the multiple first RSSI values and the range of a first preset threshold.

In an exemplary embodiment, in the above solution, the creation module includes:

a first creation unit, arranged to: create, when the position state of the ZigBee sensor is a moving state, a radio frequency power adjustment command message of the moving state of the ZigBee sensor; and a second creation unit, arranged to: create, when the position state of the ZigBee sensor is a fixed state, a radio frequency power adjustment command message of the fixed state of the ZigBee sensor.

In an exemplary embodiment, in the above solution, the operation of determining, by the determination module, a position state of the ZigBee sensor according to a fluctuation range of the multiple first RSSI values and the range of a first preset threshold includes:

judging whether the fluctuation range of the multiple first RSSI values is within the range of the first preset threshold; determining, when it is determined that the fluctuation range of the multiple first RSSI values is within the range of the first preset threshold, the position state of the ZigBee sensor as a fixed state; and determining, when it is determined that the fluctuation range of the multiple first RSSI values is not within the range of the first preset threshold, the position state of the ZigBee sensor as a moving state.

In an exemplary embodiment, in the above solution, the communication module is further arranged to: receive a second data message sent by the ZigBee sensor within a second period;

the determination module is further arranged to: acquire a second RSSI value of the second data message received by the communication module; divide the communication region into multiple first intervals according to the multiple first RSSI values, each first interval corresponding to the range of a different first RSSI value; and determine, according to the second RSSI value and the ranges of different first RSSI values, a second interval of the second RSSI value in each first interval;

the determination module is further arranged to: acquire a second RSSI value of the second data message; divide the communication region into a third interval according to the multiple first RSSI values, the third interval corresponding to the range of all first RSSI values; and determine that, according to the second RSSI value and the range of the first RSSI values, the second RSSI value is in the third interval; and the creation module is arranged to: create a radio frequency power adjustment command message of the moving state of the ZigBee sensor in each second interval; or, create a radio frequency power adjustment command message of the fixed state of the ZigBee sensor in the third interval.

In an exemplary embodiment, in the above solution, the operation of sending, by the communication module, the radio frequency power adjustment command message corresponding to the ZigBee sensor to the ZigBee sensor includes:

sending, when the position state of the ZigBee sensor is a moving state, a radio frequency power adjustment command message of the moving state of the ZigBee sensor in each second interval to the ZigBee sensor; and sending, when the position state of the ZigBee sensor is a fixed state, a radio frequency power adjustment command message of the fixed state of the ZigBee sensor in the third interval to the ZigBee sensor.

In an exemplary embodiment, in the above solution, the communication module is further arranged to: receive a power test request message of each level of radio frequency power sent by the ZigBee sensor;

the creation module is further arranged to: obtain an RSSI value of the power test request message of each level of radio frequency power according to the power test request message of each level of radio frequency power received by the communication module, and encapsulate the RSSI value of the power test request message of each level of radio frequency power into a power test response message of each level of radio frequency power; and the communication module is further arranged to: send the power test response message of each level of radio frequency power, obtained by the creation module, to the ZigBee sensor.

In an exemplary embodiment, in the above solution, the communication module is further arranged to: receive the radio frequency power adjustment response message sent by the ZigBee sensor; and the processing module is arranged to: obtain, when the position state of the ZigBee sensor is a moving state, a target radio frequency power of each second interval according to the radio frequency power adjustment response message received by the communication module, select a target radio frequency power with a maximum power value from the target radio frequency power of each second interval, and determine the selected target radio frequency power with the maximum power value as a target radio frequency power of the ZigBee sensor in the communication region; and obtain, when the position state of the ZigBee sensor is a fixed state, the target radio frequency power according to the radio frequency power adjustment response message received by the communication module, and determine the target radio frequency power as a target radio frequency power of the ZigBee sensor in the communication region.

A ZigBee sensor includes:

a communication module, arranged to: receive a radio frequency power adjustment command message sent by a ZigBee router and corresponding to the ZigBee sensor; and a determination module, arranged to: determine, according to the received radio frequency power adjustment command message received by the communication module, a target radio frequency power of the ZigBee sensor under a current position state, wherein the communication module is further arranged to: send, to the ZigBee router, a radio frequency power adjustment response message carrying the target radio frequency power of the ZigBee sensor under the current position state, determined by the determination module.

In an exemplary embodiment, in the above solution, the communication module is further arranged to: send multiple first data messages to the ZigBee router within a first period; and send a second data message to the ZigBee router within a second period.

In an exemplary embodiment, in the above solution, the operation of receiving, by the communication module, a radio frequency power adjustment command message sent by a ZigBee router and corresponding to the ZigBee sensor includes:

receiving a radio frequency power adjustment command message sent by the ZigBee router and corresponding to a moving state of the ZigBee sensor or a radio frequency power adjustment command message of a fixed state corresponding to the ZigBee sensor.

In an exemplary embodiment, in the above solution, the determination module is further arranged to: set a first threshold according to the radio frequency power adjustment command message of the ZigBee sensor under a moving state; and set N levels of radio frequency power according to the value ranges of a radio frequency power with a maximum power value and a radio frequency power with a minimum power value, N being a positive integer greater than or equal to 3;

the communication module is further arranged to: send a power test request message of each level of radio frequency power determined by the determination module to the ZigBee router; and receive a power test response message of each level of radio frequency power sent by the ZigBee router;

the determination module is further arranged to: obtain an RSSI value of the power test request message of each level of radio frequency power according to the power test response message of each level of radio frequency power received by the communication module; determine a specific level of radio frequency power meeting conditions by using a dichotomy method and the first threshold according to the RSSI value of the power test request message of each level of radio frequency power; and determine the specific level of radio frequency power meeting conditions as a target radio frequency power of the ZigBee sensor under the moving state;

or, the determination module is further arranged to: set a second threshold according to the radio frequency power adjustment command message of the ZigBee sensor under a fixed state; and set M levels of radio frequency power according to the value ranges of a radio frequency power with a maximum power value and a radio frequency power with a minimum power value, M being a positive integer greater than or equal to 3;

the communication module is further arranged to: send a power test request message of each level of radio frequency power determined by the determination module to the ZigBee router; and receive a power test response message of each level of radio frequency power sent by the ZigBee router; and the determination module is further arranged to: obtain an RSSI value of the power test request message of each level of radio frequency power according to the power test response message of each level of radio frequency power received by the communication module; determine a specific level of radio frequency power meeting conditions by using a dichotomy method and the second threshold according to the RSSI value of the power test request message of each level of radio frequency power; and determine the specific level of radio frequency power meeting conditions as a target radio frequency power of the ZigBee sensor under the fixed state.

A ZigBee system includes: a ZigBee router according to any one of the above solutions, and a ZigBee sensor according to any one of the above solutions.

According to the method for adjusting a radio frequency power, the ZigBee router, the sensor, and the system provided in the embodiments of the present disclosure, a position state of a ZigBee sensor is determined; a radio frequency power adjustment command message corresponding to the ZigBee sensor is created according to the position state of the ZigBee sensor; the radio frequency power adjustment command message corresponding to the ZigBee sensor is sent to the ZigBee sensor; and a target radio frequency power, suitable for the ZigBee sensor, in a communication region is determined according to a radio frequency power adjustment response message received from the ZigBee sensor. In the embodiments of the present disclosure, a ZigBee router automatically judges whether the position of a ZigBee sensor changes, and the ZigBee sensor is instructed by a corresponding radio frequency power adjustment command message according to the position state of the ZigBee sensor to adjust a radio frequency power to an optimal mode, thereby reducing the power consumption of the ZigBee sensor, prolonging the working period of the ZigBee sensor, and improving the working efficiency.

After the drawings and the detailed descriptions are read and understood, other aspects may be understood.

DETAILED DESCRIPTION

The implementation manners of the present disclosure will be described below in detail with reference to the accompanying drawings. It is to be noted that the embodiments herein and the features in the embodiments may be combined with each other without conflict.

The steps illustrated in the flowchart of the drawings may be executed in a computer system in accordance with a set of computer executable instructions. Also, although logical sequences are shown in the flowcharts, in some cases, the steps shown or described may be performed in a different order than the ones described herein.

Figure 1:
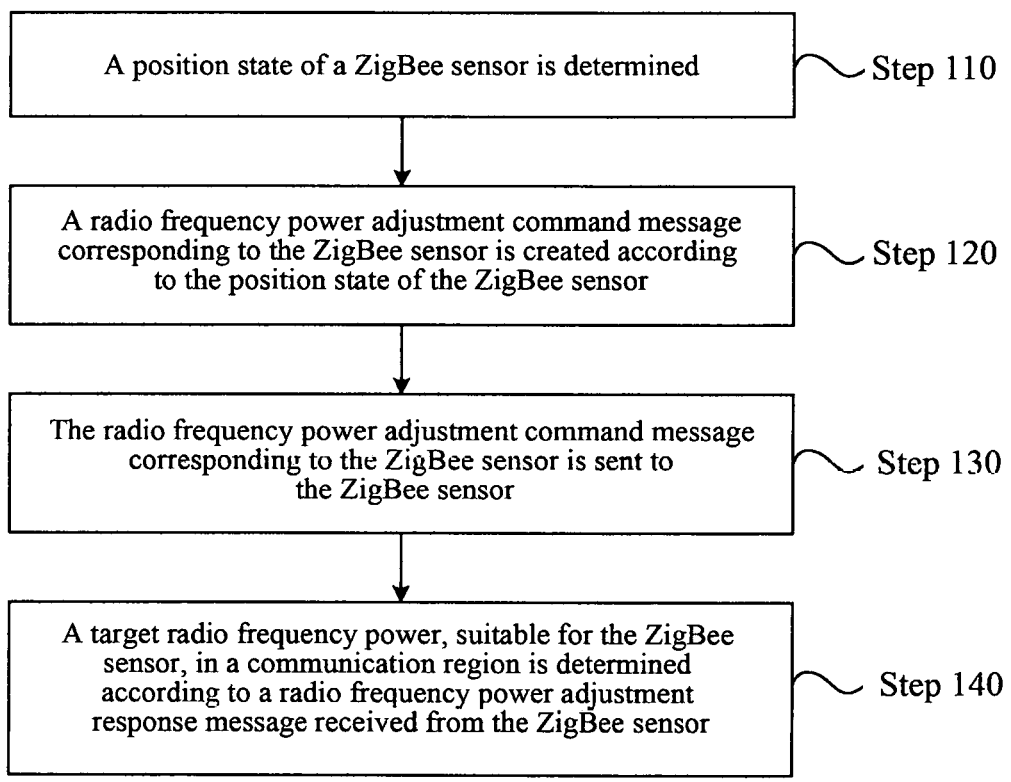
FIG. 1 is a flowchart of a method for adjusting a radio frequency power provided according to an embodiment of the present disclosure.

FIG. 1 is a flowchart of a method for adjusting a radio frequency power provided according to an embodiment of the present disclosure. The method for adjusting a radio frequency power provided according to the embodiment of the present disclosure is applied to a ZigBee router. As shown in FIG. 1, the method may include the following steps, namely step 110 to step 140.

In step 110, a position state of a ZigBee sensor is determined.

In an exemplary embodiment, in the embodiment of the present disclosure, after the ZigBee router and the ZigBee sensor are successfully networked and connected, the position state of the ZigBee sensor may be determined in an implementation manner: receiving multiple first data messages sent by the ZigBee sensor through a maximum radio frequency power within a first period, acquiring first RSSI values of the multiple first data messages, and determining the position state of the ZigBee sensor according to a fluctuation range of the multiple first RSSI values and the range of a first preset threshold.

Herein, the first period is a preset period, which may be set according to actual needs, and is not limited herein. For example, the first period is in days, and may be set to one day or three days as a period. The range of the first preset threshold may be set according to actual requirements, and is not limited herein.

Figure 2:
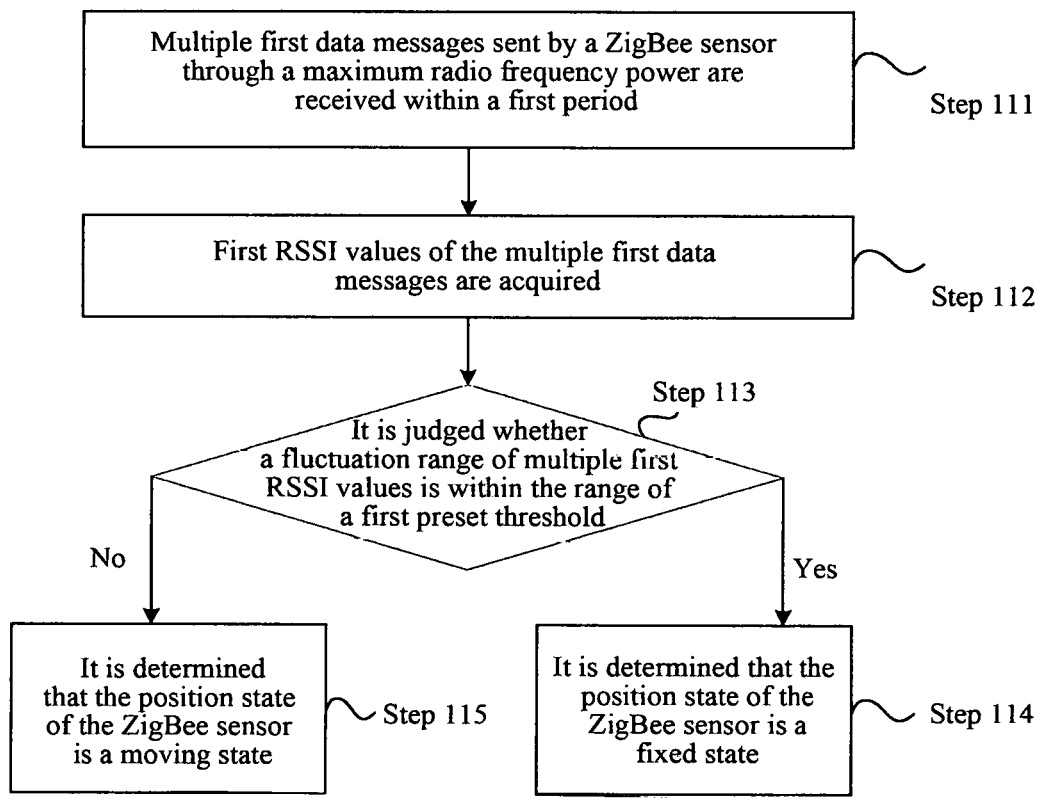
FIG. 2 is a flowchart of a mode of determining a position state of a ZigBee sensor in a method for adjusting a radio frequency power provided according to an embodiment of the present disclosure.

In an exemplary embodiment, FIG. 2 is a flowchart of a mode of determining a position state of a ZigBee sensor in a method for adjusting a radio frequency power provided according to an embodiment of the present disclosure. As shown in FIG. 2, step 110 of the method provided in the present embodiment may include the following steps, namely step 111 to step 115.

In step 111, multiple first data messages sent by the ZigBee sensor through a maximum radio frequency power are received within a first period.

Accordingly, the ZigBee router receives multiple first data messages sent by the ZigBee sensor through a maximum radio frequency power within a first period.

In step 112, first RSSI values of the multiple first data messages are acquired.

The ZigBee router acquires first RSSI values of the multiple first data messages.

In step 113, it is judged whether a fluctuation range of the multiple first RSSI values is within the range of a first preset threshold.

In the present embodiment, the ZigBee router determines a position state of the ZigBee sensor according to a fluctuation range of the multiple first RSSI values and the range of a first preset threshold, and determines that the position state of the ZigBee sensor is a fixed state when determining that the fluctuation range of the multiple first RSSI values is within the range of the first preset threshold, that is, step 114 is executed. The ZigBee router determines that the position state of the ZigBee sensor is a moving state when determining that the fluctuation range of the multiple first RSSI values is not within the range of the first preset threshold, that is, step 115 is executed.

In practical applications, the ZigBee router may perform statistical analysis on multiple first RSSI values, and calculate and record an average value, a standard deviation or a variance of multiple first RSSI values by using a statistical method. The ZigBee router judges whether the average value, the standard deviation or the variance of the first RSSI values go beyond the range of the first preset threshold. When the average value, the standard deviation or the variance of the first RSSI values go beyond the range of the first preset threshold, the ZigBee router determines that the position state of the ZigBee sensor is a moving state. When the average value, the standard deviation or the variance of the first RSSI values do not go beyond the range of the first preset threshold, the ZigBee router determines that the position state of the ZigBee sensor is a fixed state.

In step 114, it is determined that the position state of the ZigBee sensor is a fixed state.

The ZigBee router determines that the position state of the ZigBee sensor is a fixed state.

In step 115, it is determined that the position state of the ZigBee sensor is a moving state.

The ZigBee router determines that the position state of the ZigBee sensor is a moving state.

In step 120, a radio frequency power adjustment command message corresponding to the ZigBee sensor is created according to the position state of the ZigBee sensor.

In an exemplary embodiment, in the embodiment of the present disclosure, the step of creating a radio frequency power adjustment command message corresponding to the ZigBee sensor includes the following two situations. In the first situation, when the position state of the ZigBee sensor is a moving state, the ZigBee router creates a radio frequency power adjustment command message corresponding to the moving state of the ZigBee sensor, wherein the radio frequency power adjustment command message corresponding to the moving state is used to instruct the ZigBee sensor to adjust a radio frequency under the moving state. In the second situation, when the position state of the ZigBee sensor is a fixed state, the ZigBee router creates a radio frequency power adjustment command message corresponding to the fixed state of the ZigBee sensor, wherein the radio frequency power adjustment command message corresponding to the fixed state is used to instruct the ZigBee sensor to adjust a radio frequency under the fixed state.

Figure 3:
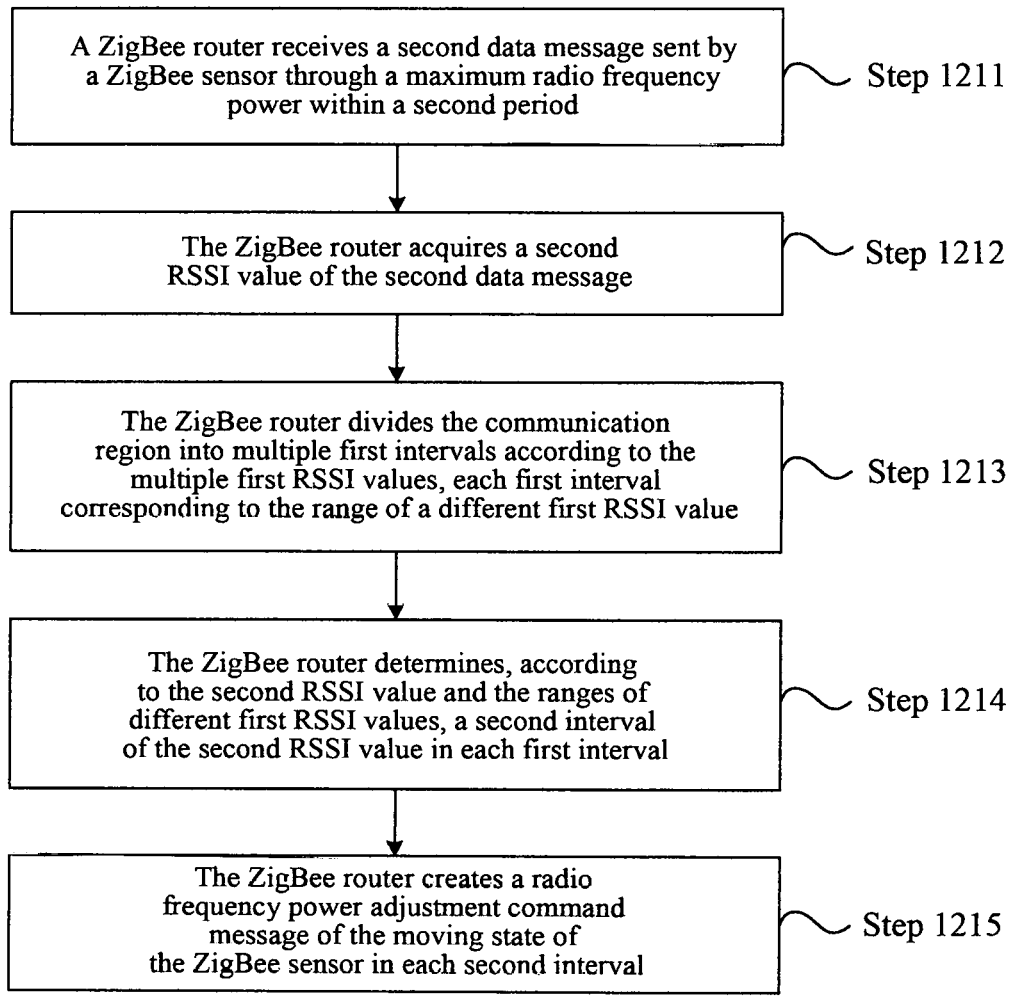
FIG. 3 is a flowchart of a mode of creating a radio frequency power adjustment command message corresponding to a ZigBee sensor in a method for adjusting a radio frequency power provided according to an embodiment of the present disclosure.

In an exemplary embodiment, in an application scenario of the embodiment of the present disclosure, FIG. 3 shows a flowchart of a mode of creating a radio frequency power adjustment command message corresponding to a ZigBee sensor in a method for adjusting a radio frequency power provided according to an embodiment of the present disclosure. The implementation manner of creating, when the position state of the ZigBee sensor is a moving state, a radio frequency power adjustment command message corresponding to the moving state of the ZigBee sensor by the ZigBee router may include the following steps, namely step 1211 to step 1215.

In step 1211, the ZigBee router receives a second data message sent by the ZigBee sensor through a maximum radio frequency power within a second period, wherein the second period is time after the first period, which may be set according to actual needs and is not limited herein.

In step 1212, the ZigBee router acquires a second RSSI value of the second data message.

In step 1213, the ZigBee router divides the communication region into multiple first intervals according to the multiple first RSSI values, each first interval corresponding to the range of a different first RSSI value, wherein the multiple first intervals may be divided according to actual needs. That is, the range of a different first RSSI value changes according to the change of the multiple first intervals, which is not limited herein. The communication region refers to a spatial range that can be normally communicated between the ZigBee sensor and the ZigBee router.

In step 1214, the ZigBee router determines, according to the second RSSI value and the ranges of different first RSSI values, a second interval of the second RSSI value in each first interval.

In step 1215, the ZigBee router creates a radio frequency power adjustment command message corresponding to the moving state of the ZigBee sensor in each second interval.

Figure 4:
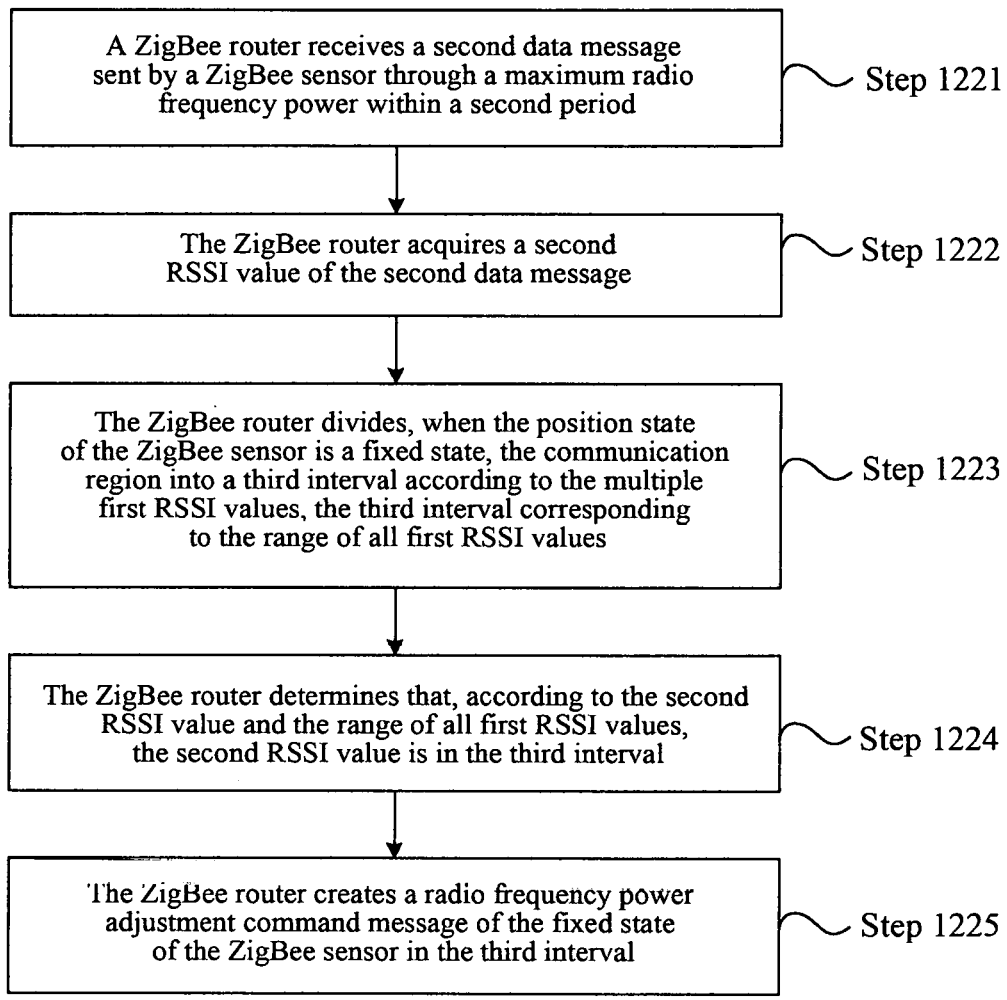
FIG. 4 is a flowchart of another mode of creating a radio frequency power adjustment command message corresponding to a ZigBee sensor in a method for adjusting a radio frequency power provided according to an embodiment of the present disclosure.

In an exemplary embodiment, in another application scenario of the embodiment of the present disclosure, FIG. 4 shows a flowchart of another mode of creating a radio frequency power adjustment command message corresponding to a ZigBee sensor in a method for adjusting a radio frequency power provided according to an embodiment of the present disclosure. The implementation manner of creating, when the position state of the ZigBee sensor is a fixed state, a radio frequency power adjustment command message corresponding to the fixed state of the ZigBee sensor by the ZigBee router may include the following steps, namely step 1221 to step 1225.

In step 1221, the ZigBee router receives a second data message sent by the ZigBee sensor through a maximum radio frequency power within a second period.

In step 1222, the ZigBee router acquires a second RSSI value of the second data message.

In step 1223, the ZigBee router divides, when the position state of the ZigBee sensor is a fixed state, the communication region into a third interval according to the multiple first RSSI values, the third interval corresponding to the range of all first RSSI values. That is, the range of all first RSSI values defines a third interval.

In step 1224, the ZigBee router determines that, according to the second RSSI value and the range of all first RSSI values, the second RSSI value is in the third interval.

In step 1225, the ZigBee router creates a radio frequency power adjustment command message corresponding to the fixed state of the ZigBee sensor in the third interval.

In step 130, the radio frequency power adjustment command message corresponding to the ZigBee sensor is sent to the ZigBee sensor.

In an exemplary embodiment, in the embodiment of the present disclosure, since the position state of the ZigBee sensor is a moving state or a fixed state, the step of sending, by the ZigBee router, the radio frequency power adjustment command message to the ZigBee sensor accordingly includes the following two situations. In the first situation, when the position state of the ZigBee sensor is a moving state, the ZigBee router sends a radio frequency power adjustment command message corresponding to the moving state of the ZigBee sensor in each second interval to the ZigBee sensor. In the second situation, when the position state of the ZigBee sensor is a fixed state, the ZigBee router sends a radio frequency power adjustment command message corresponding to the fixed state of the ZigBee sensor in the third interval to the ZigBee sensor.

In step 140, a target radio frequency power, suitable for the ZigBee sensor, in a communication region is determined according to a radio frequency power adjustment response message received from the ZigBee sensor.

The ZigBee router receives a radio frequency power adjustment response message sent by the ZigBee sensor, wherein in the embodiment of the present disclosure, a radio frequency power adjustment response message corresponding to the moving state and a radio frequency power adjustment response message corresponding to the fixed state, sent by the ZigBee sensor, are included. In an exemplary embodiment, in the embodiment of the present disclosure, the implementation manner of determining a target radio frequency power, suitable for the ZigBee sensor, in a communication region after the ZigBee router receives the radio frequency power adjustment response message includes the following two situations.

In the first situation, when the position state of the ZigBee sensor is a moving state, a target radio frequency power of each second interval is obtained according to the radio frequency power adjustment response message, a target radio frequency power with a maximum power value is selected from the target radio frequency power of each second interval, and the selected target radio frequency power with the maximum power value is determined as a target radio frequency power of the ZigBee sensor in the communication region.

In the second situation, when the position state of the ZigBee sensor is a fixed state, the target radio frequency power is obtained according to the radio frequency power adjustment response message, and the target radio frequency power is determined as a target radio frequency power of the ZigBee sensor in the communication region.

In the embodiment and the alternative implementation manner of the present disclosure, the target radio frequency power is not the minimum radio frequency power of the ZigBee sensor, but the optimal radio frequency power that the ZigBee sensor can ensure the minimum power consumption during normal communication in the communication region.

After obtaining the target radio frequency power of the ZigBee sensor, the ZigBee router may communicate with the ZigBee sensor according to the target radio frequency power of the ZigBee sensor, which reduces the power consumption of the ZigBee sensor, thereby prolonging the working period of the ZigBee sensor, and improving the working efficiency.

According to the method for adjusting a radio frequency power provided in the embodiments of the present disclosure, a position state of a ZigBee sensor is determined; a radio frequency power adjustment command message corresponding to the ZigBee sensor is created according to the position state of the ZigBee sensor; the radio frequency power adjustment command message corresponding to the ZigBee sensor is sent to the ZigBee sensor; and a target radio frequency power, suitable for the ZigBee sensor, in a communication region is determined according to a radio frequency power adjustment response message received from the ZigBee sensor. In the embodiments of the present disclosure, a ZigBee router automatically judges whether the position of a ZigBee sensor changes, and the ZigBee sensor is instructed by a corresponding radio frequency power adjustment command message according to the position state of the ZigBee sensor to adjust a radio frequency power to an optimal mode, thereby reducing the power consumption of the ZigBee sensor, prolonging the working period of the ZigBee sensor, and improving the working efficiency.

Figure 5:
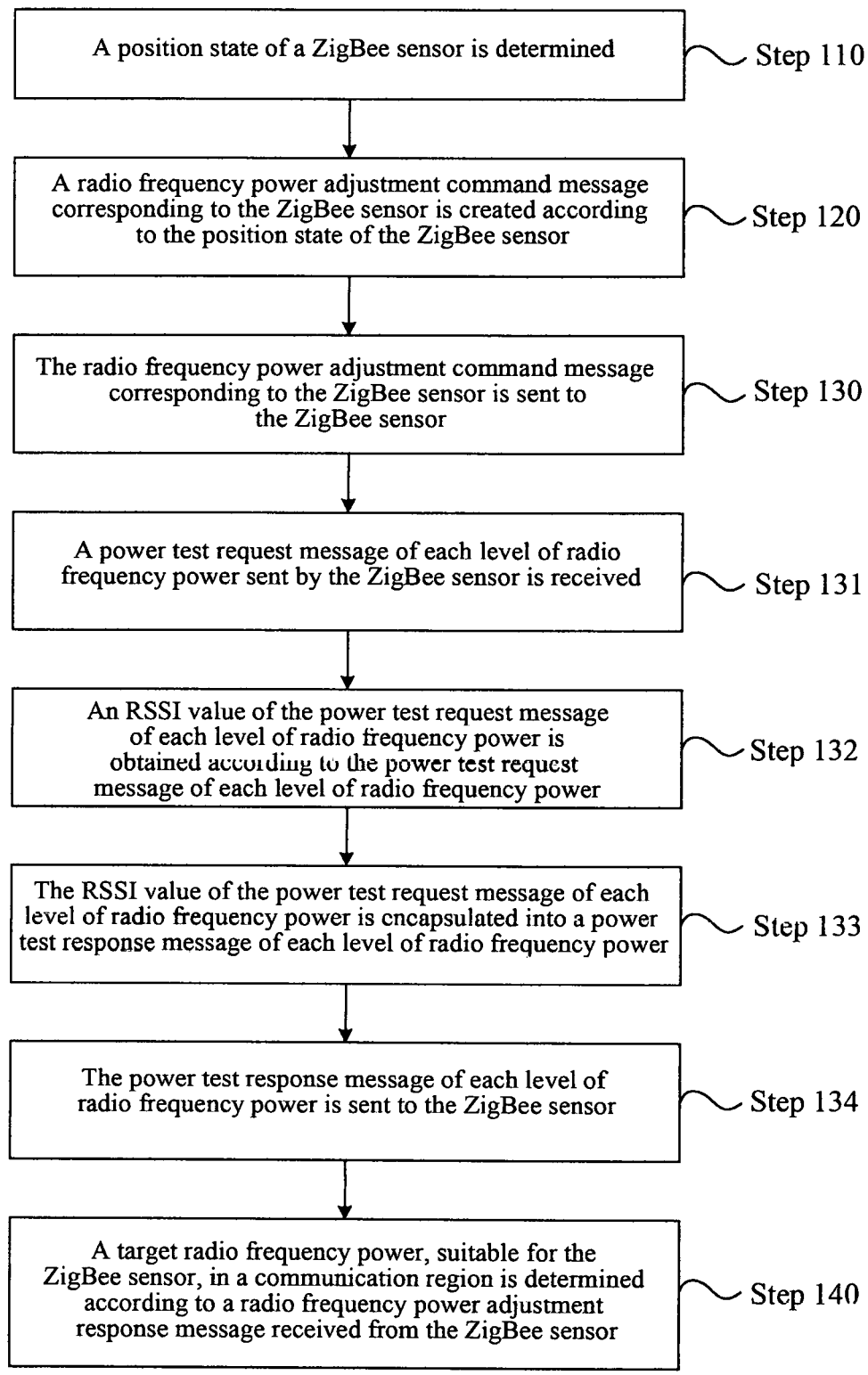
FIG. 5 is a flowchart of another method for adjusting a radio frequency power provided according to an embodiment of the present disclosure.

In an exemplary embodiment, FIG. 5 shows a flowchart of another method for adjusting a radio frequency power provided according to an embodiment of the present disclosure. On the basis of the example shown in FIG. 1, according to the method provided in the present embodiment, after step 130, the ZigBee router may also send, according to a power test request message sent by the ZigBee sensor, a power test response message to the ZigBee sensor. The implementation manner may include the following steps, namely step 131 to step 134.

In step 131, a power test request message of each level of radio frequency power sent by the ZigBee sensor is received.

In step 132, an RSSI value of the power test request message of each level of radio frequency power is obtained according to the power test request message of each level of radio frequency power.

In step 133, the RSSI value of the power test request message of each level of radio frequency power is encapsulated into a power test response message of each level of radio frequency power.

In step 134, the power test response message of each level of radio frequency power is sent to the ZigBee sensor.

Figure 6:
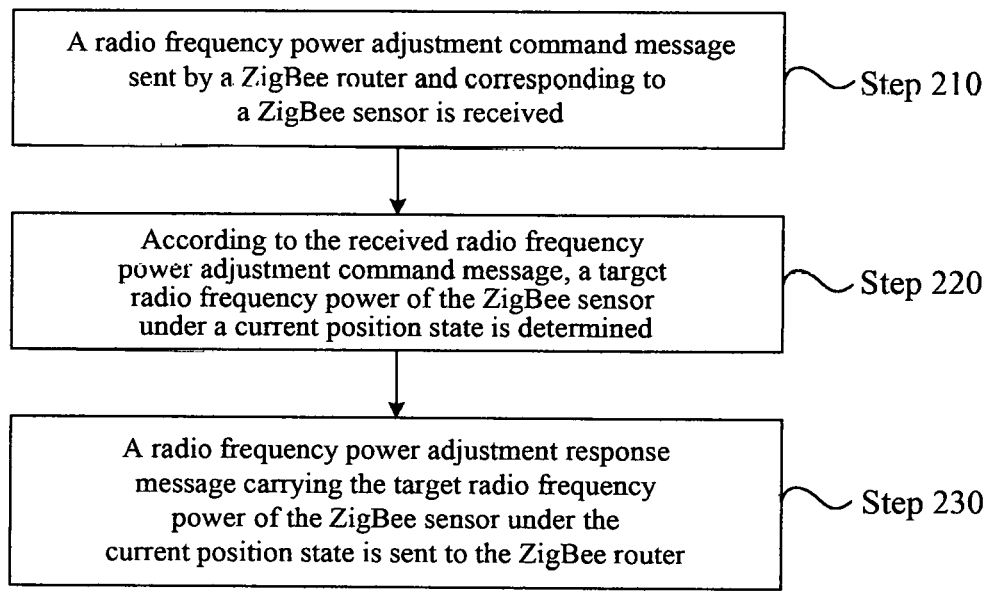
FIG. 6 is a flowchart of yet another method for adjusting a radio frequency power provided according to an embodiment of the present disclosure.

FIG. 6 is a flowchart of yet another method for adjusting a radio frequency power provided according to an embodiment of the present disclosure. The method for adjusting a radio frequency power provided according to the embodiment of the present disclosure is applied to a ZigBee sensor. As shown in FIG. 6, the method may include the following steps, namely step 210 to step 230.

In step 210, a radio frequency power adjustment command message sent by a ZigBee router and corresponding to the ZigBee sensor is received.

In an exemplary embodiment, in the embodiment of the present disclosure, a ZigBee sensor receives a radio frequency power adjustment command message of a moving state sent by a ZigBee router and corresponding to the ZigBee sensor or a radio frequency power adjustment command message of a fixed state corresponding to the ZigBee sensor.

In step 220, according to the received radio frequency power adjustment command message, a target radio frequency power of the ZigBee sensor under a current position state is determined.

In the present embodiment, the ZigBee sensor may determine a target radio frequency power of the ZigBee sensor under a current position state according to a radio frequency power adjustment command of a moving state corresponding to the ZigBee sensor or a radio frequency power adjustment command message of a fixed state corresponding to the ZigBee sensor. That is to say, there may be two implementation manners of determining, by a ZigBee sensor, a target radio frequency power of the ZigBee sensor under a current position state.

Figure 7:
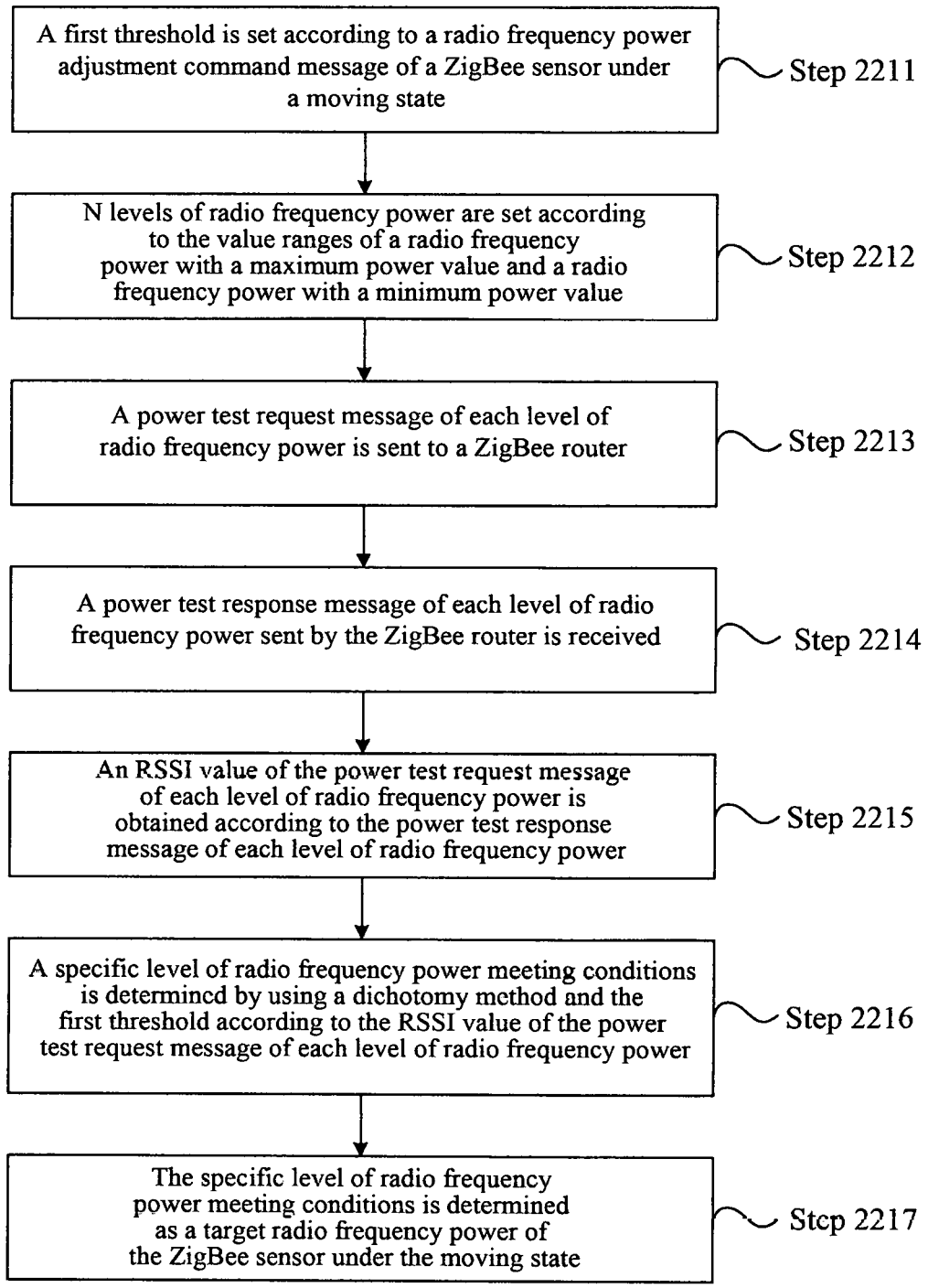
FIG. 7 is a flowchart of a mode of determining a target radio frequency power of a ZigBee sensor under a current position state in a method for adjusting a radio frequency power provided according to an embodiment of the present disclosure.

In an exemplary embodiment, in an application scenario of the embodiment of the present disclosure, FIG. 7 shows a flowchart of a mode of determining a target radio frequency power of a ZigBee sensor under a current position state in a method for adjusting a radio frequency power provided according to an embodiment of the present disclosure. In this application scenario, a radio frequency power adjustment command corresponding to the ZigBee sensor is a radio frequency power adjustment command of a moving state corresponding to the ZigBee sensor. The method provided in the present embodiment may include the following steps, namely step 2211 to step 2217.

In step 2211, a first threshold is set according to the radio frequency power adjustment command message of the ZigBee sensor under a moving state.

A ZigBee sensor sets a first threshold according to a radio frequency power adjustment command message of the ZigBee sensor under a moving state. The first threshold may be determined according to the radio frequency power adjustment command message under the moving state, to meet a radio frequency power ensuring that the ZigBee sensor can perform normal communication.

In step 2212, N levels of radio frequency power are set according to the value ranges of a radio frequency power with a maximum power value and a radio frequency power with a minimum power value.

The ZigBee sensor sets N levels of radio frequency power according to the value ranges of a radio frequency power with a maximum power value and a radio frequency power with a minimum power value. That is, the set radio frequency power is $1^{st}$ level, $2^{nd}$ level, . . . , $N^{th}$ level, wherein N is a positive integer greater than or equal to 3. The N levels of radio frequency power may be set according to actual needs, and will not be limited herein.

In step 2213, a power test request message of each level of radio frequency power is sent to the ZigBee router.

The ZigBee sensor sends a power test request message of each level of radio frequency power to the ZigBee router. In order to ensure the accuracy of the obtained RSSI value, a power test request message of each level of radio frequency power may be sent to the ZigBee router repeatedly.

In step 2214, a power test response message of each level of radio frequency power sent by the ZigBee router is received.

The ZigBee sensor receives a power test response message of each level of radio frequency power sent by the ZigBee router. The ZigBee sensor may receive a power test response message of each level of radio frequency power repeatedly sent by the ZigBee router.

In step 2215, an RSSI value of the power test request message of each level of radio frequency power is obtained according to the power test response message of each level of radio frequency power.

The ZigBee sensor obtains an RSSI value of the power test request message of each level of radio frequency power according to the received power test response message of each level of radio frequency power, calculates, when repeatedly receiving the RSSI value of the power test request message of each level of radio frequency power, an average value of the repeatedly-received RSSI values of the power test response message of each level of radio frequency power, and takes the average value as a judgment basis, so that the accuracy can be improved.

In step 2216, a specific level of radio frequency power meeting conditions is determined by using a dichotomy method and the first threshold according to the RSSI value of the power test request message of each level of radio frequency power.

In the embodiment of the present disclosure, a specific level of radio frequency power meeting conditions is determined based on a dichotomy method, and other algorithms may also be adopted; the dichotomy algorithm is simple and efficient, and it is suitable for the case where the ZigBee sensor has a low computing capability.

The ZigBee sensor uses the dichotomy method and the first threshold to determine an RSSI value of a power test request message of a specific level of radio frequency power meeting an optimal radio frequency power condition according to the RSSI value of the power test request message of each level of radio frequency power. The optimal radio frequency power condition may be that the previous RSSI value in RSSI values of power test request messages of two successive levels of radio frequency power is greater than or equal to the first threshold and the subsequent RSSI value is less than the first threshold or the subsequent RSSI value is the minimum level.

If the optimal radio frequency power condition is not met, the dichotomy method and the first threshold are continued to be used until the RSSI value of the power test request message of the specific level of radio frequency power meeting the optimal radio frequency power condition is determined.

Step 2217, the specific level of radio frequency power meeting conditions is determined as a target radio frequency power of the ZigBee sensor under the moving state.

The ZigBee sensor determines the level of radio frequency power corresponding to the RSSI value meeting the optimal radio frequency power condition as a target radio frequency power of the ZigBee sensor under the moving state.

For example, when there are currently 8 levels of radio frequency power, the RSSI value of the $3^{rd}$ level and the RSSI value of the $4^{th}$ level are in accordance with the optimal radio frequency power condition, so that the RSSI value of the $3^{rd}$ level may be determined to be optimal. Therefore, a radio frequency power corresponding to the $3^{rd}$ level may be determined as a target radio frequency power of the ZigBee sensor under the moving state.

Figure 8:
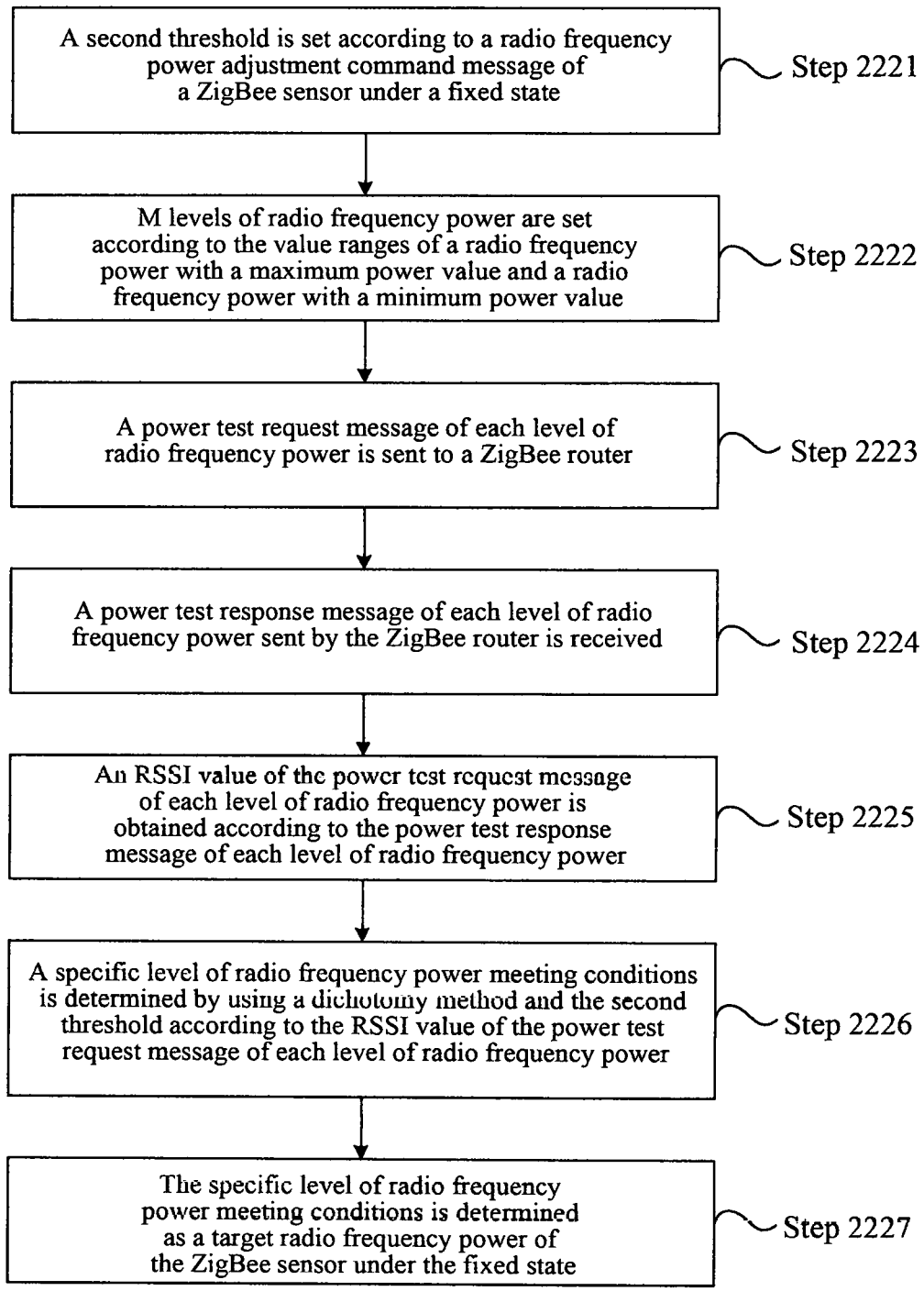
FIG. 8 is a flowchart of another mode of determining a target radio frequency power of a ZigBee sensor under a current position state in a method for adjusting a radio frequency power provided according to an embodiment of the present disclosure.

In an exemplary embodiment, in another application scenario of the embodiment of the present disclosure, FIG. 8 shows a flowchart of another mode of determining a target radio frequency power of a ZigBee sensor under a current position state in a method for adjusting a radio frequency power provided according to an embodiment of the present disclosure. In this application scenario, a radio frequency power adjustment command corresponding to the ZigBee sensor is a radio frequency power adjustment command of a fixed state corresponding to the ZigBee sensor. The method provided in the present embodiment may include the following steps, namely step 2221 to step 2227.

In step 2221, a second threshold is set according to the radio frequency power adjustment command message of the ZigBee sensor under a fixed state.

A ZigBee sensor sets a second threshold according to a radio frequency power adjustment command message of the ZigBee sensor under a fixed state. The second threshold may be determined according to the radio frequency power adjustment command message under the fixed state, to meet a radio frequency power ensuring that the ZigBee sensor can perform normal communication.

In step 2222, M levels of radio frequency power are set according to the value ranges of a radio frequency power with a maximum power value and a radio frequency power with a minimum power value.

The ZigBee sensor sets M levels of radio frequency power according to the value ranges of a radio frequency power with a maximum power value and a radio frequency power with a minimum power value. That is, the set radio frequency power is $1^{st}$ level, $2^{nd}$ level, . . . , $M^{th}$ level, wherein M is a positive integer greater than or equal to 3. The M levels of radio frequency power may be set according to actual needs, and will not be limited herein.

In step 2223, a power test request message of each level of radio frequency power is sent to the ZigBee router.

The ZigBee sensor sends a power test request message of each level of radio frequency power to the ZigBee router. In order to ensure the accuracy of the obtained RSSI value, a power test request message of each level of radio frequency power may be sent to the ZigBee router repeatedly.

In step 2224, a power test response message of each level of radio frequency power sent by the ZigBee router is received.

The ZigBee sensor receives a power test response message of each level of radio frequency power sent by the ZigBee router. The ZigBee sensor may receive a power test response message of each level of radio frequency power repeatedly sent by the ZigBee router.

In step 2225, an RSSI value of the power test request message of each level of radio frequency power is obtained according to the power test response message of each level of radio frequency power.

The ZigBee sensor obtains an RSSI value of the power test request message of each level of radio frequency power according to the received power test response message of each level of radio frequency power, calculates, when repeatedly receiving the RSSI values of the power test request message of each level of radio frequency power, an average value of the repeatedly-received RSSI values of the power test request message of each level of radio frequency power, and takes the average value as a judgment basis, so that the accuracy can be improved.

In step 2226, a specific level of radio frequency power meeting conditions is determined by using a dichotomy method and the second threshold according to the RSSI value of the power test request message of each level of radio frequency power.

The ZigBee sensor uses the dichotomy method and the second threshold to determine an RSSI value of a power test request message of a specific level of radio frequency power meeting an optimal radio frequency power condition according to the RSSI value of the power test request message of each level of radio frequency power. The optimal radio frequency power condition may be that the previous RSSI value in RSSI values of power test request messages of two successive levels of radio frequency power is greater than or equal to the second threshold and the subsequent RSSI value is less than the second threshold or the subsequent RSSI value is the minimum level.

If the optimal radio frequency power condition is not met, the dichotomy method and the second threshold are continued to be used until the RSSI value of the power test request message of the specific level of radio frequency power meeting the optimal radio frequency power condition is determined.

Step 2227, the specific level of radio frequency power meeting conditions is determined as a target radio frequency power of the ZigBee sensor under the fixed state.

The ZigBee sensor determines the level of radio frequency power corresponding to the RSSI value meeting the optimal radio frequency power condition as a target radio frequency power of the ZigBee sensor under the fixed state.

For example, when there are currently 6 levels of radio frequency power, the RSSI value of the $2^{nd}$ level and the RSSI value of the $3^{rd}$ level are in accordance with the optimal radio frequency power condition, so that the RSSI value of the $2^{nd}$ level may be determined to be optimal. Therefore, a radio frequency power corresponding to the $2^{nd}$ level may be determined as a target radio frequency power of the ZigBee sensor under the fixed state.

In step 230, a radio frequency power adjustment response message carrying the target radio frequency power of the ZigBee sensor under the current position state is sent to the ZigBee router.

In the embodiment of the present disclosure, when the ZigBee router determines that the ZigBee sensor is in a moving state, the ZigBee sensor sends a radio frequency power adjustment response message carrying the target radio frequency power of the ZigBee sensor under the moving state to the ZigBee router; and when the ZigBee router determines that the ZigBee sensor is in a fixed state, the ZigBee sensor sends a radio frequency power adjustment response message carrying the target radio frequency power of the ZigBee sensor under the fixed state to the ZigBee router.

According to the method for adjusting a radio frequency power provided in the embodiment of the present disclosure, a radio frequency power adjustment command message sent by a ZigBee router and corresponding to a ZigBee sensor is received; according to the received radio frequency power adjustment command message, a target radio frequency power of the ZigBee sensor under a current position state is determined; and a radio frequency power adjustment response message carrying the target radio frequency power of the ZigBee sensor under the current position state is sent to the ZigBee router. In the embodiment of the present disclosure, a ZigBee router sends a corresponding radio frequency power adjustment command message to a ZigBee sensor according to a current position state of the ZigBee sensor, and the ZigBee sensor adjusts an own radio frequency power to an optimal mode according to the corresponding radio frequency power adjustment command message and feeds back the radio frequency power in the optimal mode to the ZigBee router, so that the ZigBee sensor communicates with the ZigBee router by using the radio frequency power in the optimal mode, thereby reducing the power consumption of the ZigBee sensor, prolonging the working period of the ZigBee sensor, and improving the working efficiency.

Figure 9:
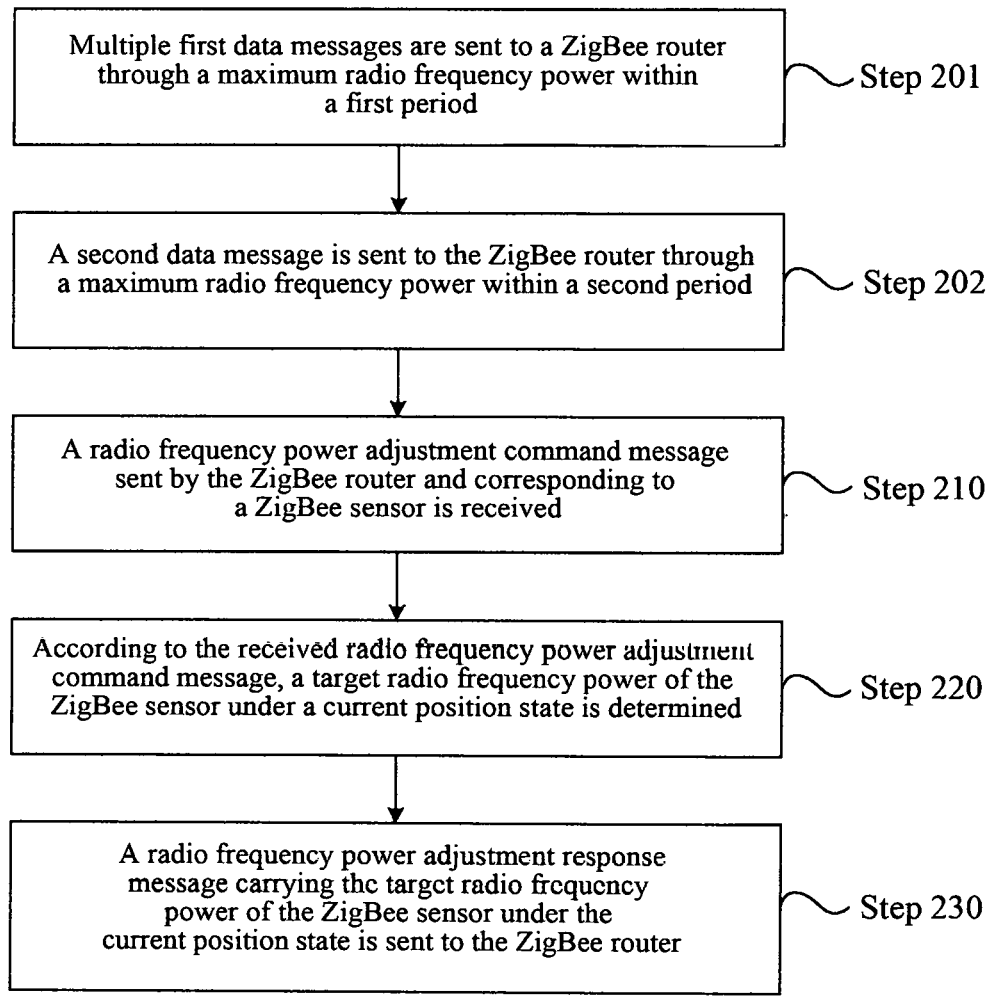
FIG. 9 is a flowchart of a further method for adjusting a radio frequency power provided according to an embodiment of the present disclosure.

In an exemplary embodiment, FIG. 9 is a flowchart of a further method for adjusting a radio frequency power provided according to an embodiment of the present disclosure. On the basis of the example shown in FIG. 6, the method provided in the present embodiment may include step 201 to step 202 before step 210.

In step 201, multiple first data messages are sent to the ZigBee router through a maximum radio frequency power within a first period.

After the ZigBee sensor and the ZigBee router are successfully networked and connected, multiple first data messages are sent to the ZigBee router through a maximum radio frequency power within a first period. The first period may be a preset period, which may be set according to actual needs, and is not limited herein.

In step 202, a second data message is sent to the ZigBee router through a maximum radio frequency power within a second period.

The ZigBee sensor sends a second data message to the ZigBee router through a maximum radio frequency power within a second period. The second period is time after the first period, which may be set according to actual needs and is not limited herein.

According to the method for adjusting a radio frequency power provided in the embodiment of the present disclosure, multiple first data messages are sent to a ZigBee router through a maximum radio frequency power within a first period; a second data message is sent to the ZigBee router through a maximum radio frequency power within a second period; a radio frequency power adjustment command message sent by the ZigBee router and corresponding to a ZigBee sensor is received; according to the received radio frequency power adjustment command message, a target radio frequency power of the ZigBee sensor under a current position state is determined; and a radio frequency power adjustment response message carrying the target radio frequency power of the ZigBee sensor under the current position state is sent to the ZigBee router. In the embodiment of the present disclosure, a ZigBee router may automatically judge whether the position of a ZigBee sensor changes according to a first data message and a second data message sent by the ZigBee sensor, and the ZigBee router sends a corresponding radio frequency power adjustment command message to the ZigBee sensor according to a current position state of the ZigBee sensor, and the ZigBee sensor adjusts an own radio frequency power to an optimal mode according to the corresponding radio frequency power adjustment command message and feeds back the radio frequency power in the optimal mode to the ZigBee router, so that the ZigBee sensor communicates with the ZigBee router by using the radio frequency power in the optimal mode, thereby reducing the power consumption of the ZigBee sensor, prolonging the working period of the ZigBee sensor, and improving the working efficiency.

In order to further clarify the purpose of the embodiments of the present disclosure, based on the foregoing embodiments and alternative implementation manners, a method for adjusting a radio frequency power is described in detail by an interactive execution manner of a system composed of a ZigBee router and a ZigBee sensor.

Figure 10:
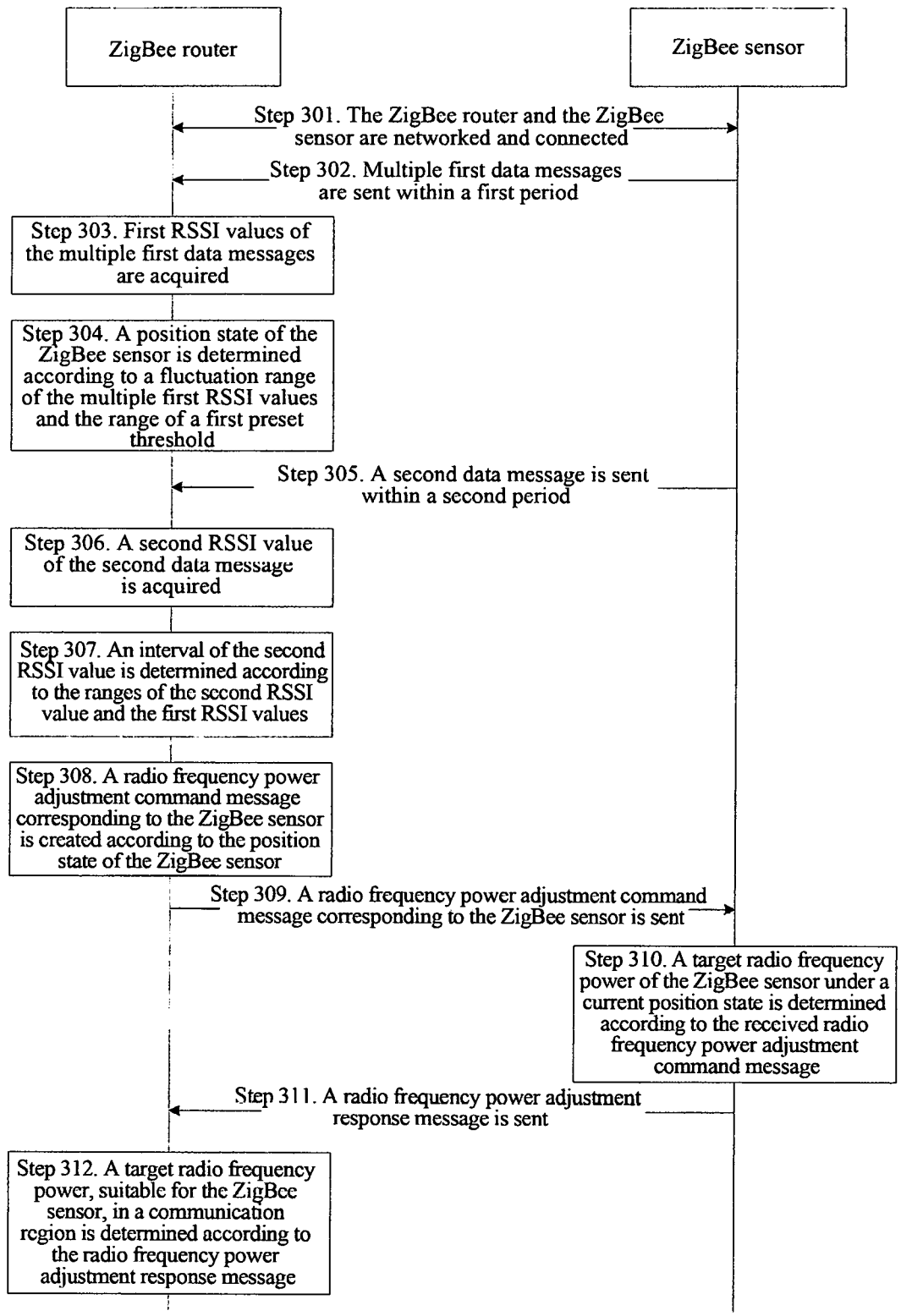
FIG. 10 is an interactive flowchart of a method for adjusting a radio frequency power provided according to an embodiment of the present disclosure.

FIG. 10 is an interactive flowchart of a method for adjusting a radio frequency power provided according to an embodiment of the present disclosure. The method for adjusting a radio frequency power in the embodiment of the present disclosure is applied to a system composed of a ZigBee router and a ZigBee sensor. As shown in FIG. 10, the method may include the following steps, namely step 301 to step 312.

In step 301, the ZigBee router and the ZigBee sensor are networked and connected.

The ZigBee router and the ZigBee sensor are networked and connected for subsequent communication therebetween.

In step 302, the ZigBee sensor sends multiple first data messages to the ZigBee router through a maximum radio frequency power within a first period, and accordingly, the ZigBee router receives the multiple first data messages sent by the ZigBee sensor through the maximum radio frequency power within the first period.

The ZigBee sensor sends multiple first data messages to the ZigBee router through a maximum radio frequency power within a first period, and accordingly, the ZigBee router receives multiple first data messages sent by the ZigBee sensor through a maximum radio frequency power within a first period. The first period is a preset period, which may be set according to actual needs, and is not limited herein.

In step 303, the ZigBee router acquires first RSSI values of the multiple first data messages.

The ZigBee router acquires first RSSI values of the multiple first data messages.

In step 304, the ZigBee router determines a position state of the ZigBee sensor according to a fluctuation range of the multiple first RSSI values and the range of a first preset threshold.

The ZigBee router determines a position state of the ZigBee sensor according to a fluctuation range of the multiple first RSSI values and the range of a first preset threshold. How to determine a position state of the ZigBee sensor by using the ZigBee router may refer to the solution described in the foregoing embodiment, and will not be elaborated herein.

In step 305, the ZigBee sensor sends a second data message to the ZigBee router through a maximum radio frequency power within a second period, and accordingly, the ZigBee router receives the second data message sent by the ZigBee sensor through the maximum radio frequency power within the second period.

The ZigBee sensor sends a second data message to the ZigBee router through a maximum radio frequency power within a second period, and accordingly, the ZigBee router receives the second data message sent by the ZigBee sensor through the maximum radio frequency power within the second period. The second period is time after the first period, which may be set according to actual needs and is not limited herein.

In step 306, the ZigBee router acquires a second RSSI value of the second data message.

The ZigBee router acquires a second RSSI value of the second data message.

In step 307, the ZigBee router determines, according to the ranges of the second RSSI value and the first RSSI values, an interval of the second RSSI value.

The ZigBee router determines, according to the ranges of the second RSSI value and the first RSSI values, an interval of the second RSSI value, so that the position state of the ZigBee sensor may be determined.

In step 308, the ZigBee router creates a radio frequency power adjustment command message corresponding to the ZigBee sensor according to the position state of the ZigBee sensor.

In practical applications, when the position state of the ZigBee sensor is a moving state, the ZigBee router creates a radio frequency power adjustment command message of the moving state of the ZigBee sensor; and when the position state of the ZigBee sensor is a fixed state, the ZigBee router creates a radio frequency power adjustment command message of the fixed state of the ZigBee sensor.

How to create, by the ZigBee router, a radio frequency power adjustment command message corresponding to the ZigBee sensor according to the position state of the ZigBee sensor may refer to the solution described in the foregoing embodiment, and will not be elaborated herein.

In step 309, the ZigBee router sends a radio frequency power adjustment command message corresponding to the ZigBee sensor to the ZigBee sensor, and accordingly, the ZigBee sensor receives the radio frequency power adjustment command message sent by the ZigBee router and corresponding to the ZigBee sensor.

In practical applications, when the position state of the ZigBee sensor is a moving state, the ZigBee router sends a radio frequency power adjustment command message of the moving state of the ZigBee sensor in each interval, and the ZigBee sensor receives the radio frequency power adjustment command message sent by the ZigBee router and corresponding to the moving state of the ZigBee sensor in each interval; and when the position state of the ZigBee sensor is a fixed state, the ZigBee router sends, to the ZigBee sensor, a radio frequency power adjustment command message of the fixed state of the ZigBee sensor in an interval, and the ZigBee sensor receives the radio frequency power adjustment command message sent by the ZigBee router and corresponding to the fixed state of the ZigBee sensor in the interval.

In step 310, the ZigBee sensor determines, according to the received radio frequency power adjustment command message, a target radio frequency power of the ZigBee sensor under a current position state.

The ZigBee sensor determines, according to the radio frequency power adjustment command message of the moving state corresponding to the ZigBee sensor or the radio frequency power adjustment command message of the fixed state corresponding to the ZigBee sensor, a target radio frequency power of the ZigBee sensor under a current position state. How to practically determine, by the ZigBee sensor, a target radio frequency power may refer to the solution described in the foregoing embodiment, and will not be elaborated herein.

In step 311, the ZigBee sensor sends a radio frequency power adjustment response message to the ZigBee router, and accordingly, the ZigBee router receives the radio frequency power adjustment response message sent by the ZigBee sensor.

In practical applications, the ZigBee sensor sends a radio frequency power adjustment response message carrying the target radio frequency power of the ZigBee sensor under the moving state to the ZigBee router, and the ZigBee router receives the radio frequency power adjustment response message sent by the ZigBee sensor and carrying the target radio frequency power of the ZigBee sensor under the moving state; or, the ZigBee sensor sends a radio frequency power adjustment response message carrying the target radio frequency power of the ZigBee sensor under the fixed state to the ZigBee router, and the ZigBee router receives the radio frequency power adjustment response message sent by the ZigBee sensor and carrying the target radio frequency power of the ZigBee sensor under the fixed state.

In the embodiment of the present disclosure, the above target radio frequency power is not the minimum radio frequency power of the ZigBee sensor, but the minimum radio frequency power that the ZigBee sensor can ensure normal communication.

In step 312, the ZigBee router determines a target radio frequency power, suitable for the ZigBee sensor, in a communication region according to the received radio frequency power adjustment response message.

In practical applications, when the position state of the ZigBee sensor is a moving state, the ZigBee router obtains a target radio frequency power of each interval according to a radio frequency power adjustment response message sent by the ZigBee sensor and carrying the target radio frequency power of the ZigBee sensor under the moving state, and it selects a target radio frequency power with a maximum power value from the target radio frequency power of each interval as a target radio frequency power of the ZigBee sensor in a communication region.

When the position state of the ZigBee sensor is a fixed state, the ZigBee router obtains a target radio frequency power according to a radio frequency power adjustment response message sent by the ZigBee sensor and carrying the target radio frequency power of the ZigBee sensor under the fixed state, and it determines the target radio frequency power as a target radio frequency power of the ZigBee sensor in a communication region.

According to the method for adjusting a radio frequency power provided in the embodiment of the present disclosure, a ZigBee router and a ZigBee sensor are networked and connected; the ZigBee router receives multiple first data messages sent by the ZigBee sensor through a maximum radio frequency power within a first period; the ZigBee router acquires first RSSI values of the multiple first data messages, and determines a position state of the ZigBee sensor according to a fluctuation range of the multiple first RSSI values and the range of a first preset threshold; the ZigBee router receives a second data message sent by the ZigBee sensor through a maximum radio frequency power within a second period; the ZigBee router acquires a second RSSI value of the second data message, and determines, according to the ranges of the second RSSI value and the first RSSI values, an interval of the second RSSI value, so that the ZigBee router creates a radio frequency power adjustment command message corresponding to the ZigBee sensor according to a position state of the ZigBee sensor, and sends the created radio frequency power adjustment command message to the ZigBee sensor; the ZigBee sensor determines, according to the received radio frequency power adjustment command message, a target radio frequency power of the ZigBee sensor under a current position state, and sends a radio frequency power adjustment response message to the ZigBee router; and the ZigBee router determines a target radio frequency power, suitable for the ZigBee sensor, in a communication region according to the received radio frequency power adjustment response message. In the embodiments of the present disclosure, a ZigBee router automatically judges whether the position of a ZigBee sensor changes, and sends a corresponding radio frequency power adjustment command message to the ZigBee sensor according to the position state of the ZigBee sensor, and the ZigBee sensor adjusts a radio frequency power to an optimal mode according to the corresponding radio frequency power adjustment command message and feeds back the radio frequency power in the optimal mode to the ZigBee router, so that the ZigBee sensor communicates with the ZigBee router by using the radio frequency power in the optimal mode, thereby reducing the power consumption of the ZigBee sensor, prolonging the working period of the ZigBee sensor, and improving the working efficiency.

Figure 11:
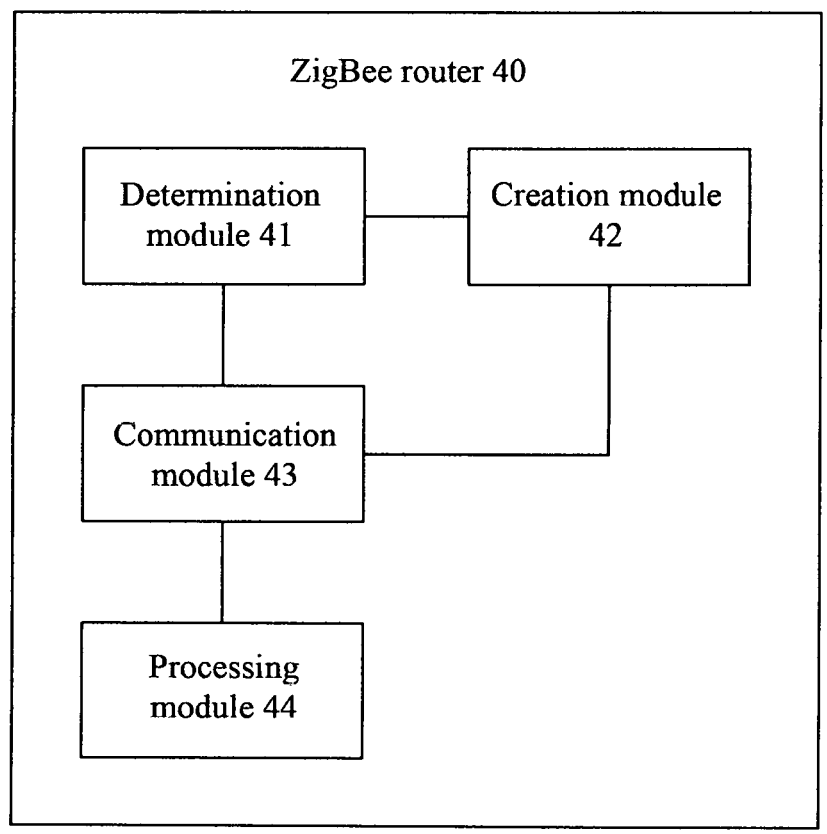
FIG. 11 is a structure schematic diagram of a ZigBee router according to an embodiment of the present disclosure.

FIG. 11 is a structure schematic diagram of a ZigBee router according to an embodiment of the present disclosure. As shown in FIG. 11, the ZigBee router 40 provided in the present embodiment includes: a determination module 41, a creation module 42, a communication module 43, and a processing module 44.

The determination module 41 is arranged to: determine a position state of a ZigBee sensor.

The creation module 42 is arranged to: create a radio frequency power adjustment command message corresponding to the ZigBee sensor according to the position state of the ZigBee sensor determined by the determination module 41.

The communication module 43 is arranged to: send, to the ZigBee sensor, the radio frequency power adjustment command message created by the creation module 42 and corresponding to the ZigBee sensor.

The processing module 44 is arranged to: determine a target radio frequency power, suitable for the ZigBee sensor, in a communication region according to a radio frequency power adjustment response message received by the communication module 43 from the ZigBee sensor.

In an exemplary embodiment, in the embodiment of the present disclosure, the communication module 43 is further arranged to: receive multiple first data messages sent by the ZigBee sensor within a first period.

Accordingly, the determination module 41 is further arranged to: acquire first RSSI values of the multiple first data messages received by the communication module 43; and determine a position state of the ZigBee sensor according to a fluctuation range of the multiple first RSSI values and the range of a first preset threshold.

In an exemplary embodiment, in the embodiment of the present disclosure, the creation module 42 may include:

a first creation unit, arranged to: create, when the position state of the ZigBee sensor is a moving state, a radio frequency power adjustment command message of the moving state of the ZigBee sensor; and a second creation unit, arranged to: create, when the position state of the ZigBee sensor is a fixed state, a radio frequency power adjustment command message of the fixed state of the ZigBee sensor.

In an exemplary embodiment, in the embodiment of the present disclosure, the operation of determining, by the determination module 41, a position state of the ZigBee sensor according to a fluctuation range of the multiple first RSSI values and the range of a first preset threshold includes: judging whether the fluctuation range of the multiple first RSSI values is within the range of the first preset threshold; determining, when it is determined that the fluctuation range of the multiple first RSSI values is within the range of the first preset threshold, the position state of the ZigBee sensor as a fixed state; and determining, when it is determined that the fluctuation range of the multiple first RSSI values is not within the range of the first preset threshold, the position state of the ZigBee sensor as a moving state.

In an exemplary embodiment, in the embodiment of the present disclosure, the communication module 43 is further arranged to: receive a second data message sent by the ZigBee sensor within a second period.

Accordingly, the determination module 41 is further arranged to: acquire a second RSSI value of the second data message received by the communication module 43; divide the communication region into multiple first intervals according to the multiple first RSSI values, each first interval corresponding to the range of a different first RSSI value; and determine, according to the second RSSI value and the range of different first RSSI values, a second interval of the second RSSI value in multiple first intervals.

The determination module 41 is further arranged to: acquire a second RSSI value of the second data message; divide the communication region into a third interval according to the multiple first RSSI values, the third interval corresponding to the range of all first RSSI values; and determine that, according to the second RSSI value and the range of the first RSSI values, the second RSSI value is in the third interval.

The creation module 42 is arranged to: create a radio frequency power adjustment command message of the moving state of the ZigBee sensor in each second interval; or, create a radio frequency power adjustment command message of the fixed state of the ZigBee sensor in the third interval.

In an exemplary embodiment, in the embodiment of the present disclosure, the operation of sending, by the communication module 43, the radio frequency power adjustment command message corresponding to the ZigBee sensor to the ZigBee sensor includes: sending, when the position state of the ZigBee sensor is a moving state, a radio frequency power adjustment command message of the moving state of the ZigBee sensor in each second interval to the ZigBee sensor; and sending, when the position state of the ZigBee sensor is a fixed state, a radio frequency power adjustment command message of the fixed state of the ZigBee sensor in the third interval to the ZigBee sensor.

In an exemplary embodiment, in the embodiment of the present disclosure, the communication module 43 is further arranged to: receive a power test request message of each level of radio frequency power sent by the ZigBee sensor.

Accordingly, the creation module 42 is further arranged to: obtain an RSSI value of the power test request message of each level of radio frequency power according to the power test request message of each level of radio frequency power received by the communication module 43, and encapsulate the RSSI value of the power test request message of each level of radio frequency power into a power test response message of each level of radio frequency power.

The communication module 43 is further arranged to: send the power test response message of each level of radio frequency power, obtained by the creation module 42, to the ZigBee sensor.

In an exemplary embodiment, in the embodiment of the present disclosure, the communication module 43 is further arranged to: receive the radio frequency power adjustment response message sent by the ZigBee sensor.

Accordingly, the processing module 44 is arranged to: obtain, when the position state of the ZigBee sensor is a moving state, a target radio frequency power of each second interval according to the radio frequency power adjustment response message received by the communication module 43, select a target radio frequency power with a maximum power value from the target radio frequency power of each second interval, and determine the selected target radio frequency power with the maximum power value as a target radio frequency power of the ZigBee sensor in the communication region; and obtain, when the position state of the ZigBee sensor is a fixed state, the target radio frequency power according to the radio frequency power adjustment response message received by the communication module 43, and determine the target radio frequency power as a target radio frequency power of the ZigBee sensor in the communication region.

The ZigBee router in the present embodiment may be used to implement the technical solution shown in the foregoing method embodiment, the implementation principle and the technical effect are similar, and details are not described herein again.

In practical application, the determination module 41, the creation module 42, the communication module 43 and the processing module 44 may be implemented by devices such as a Central Processing Unit (CPU), a Microprocessor Unit (MPU), a Digital Signal Processor (DSP), or a Field Programmable Gate Array (FPGA) in the ZigBee router.

Figure 12:
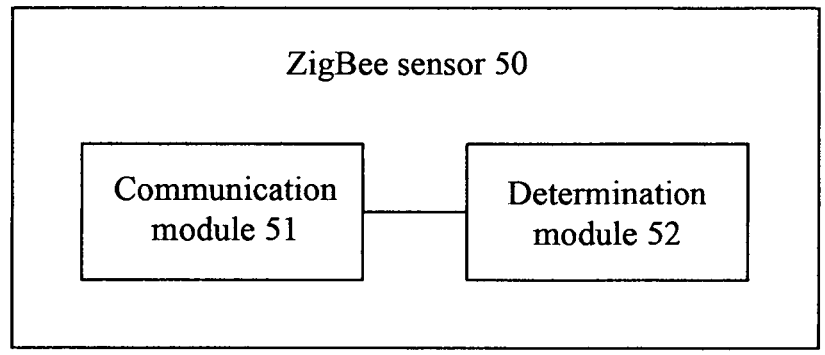
FIG. 12 is a structure schematic diagram of a ZigBee sensor according to an embodiment of the present disclosure.

FIG. 12 is a structure schematic diagram of a ZigBee sensor according to an embodiment of the present disclosure. As shown in FIG. 12, the ZigBee sensor 50 provided in the present embodiment includes: a communication module 51 and a determination module 52.

The communication module 51 is arranged to: receive a radio frequency power adjustment command message sent by a ZigBee router and corresponding to the ZigBee sensor.

The determination module 52 is arranged to: determine, according to the received radio frequency power adjustment command message received by the communication module 51, a target radio frequency power of the ZigBee sensor under a current position state.

The communication module 51 is further arranged to: send, to the ZigBee router, a radio frequency power adjustment response message carrying the target radio frequency power of the ZigBee sensor under the current position state, determined by the determination module 52.

In an exemplary embodiment, in the embodiment of the present disclosure, the communication module 51 is further arranged to: send multiple first data messages to the ZigBee router within a first period; and send a second data message to the ZigBee router within a second period.

In an exemplary embodiment, in the embodiment of the present disclosure, the operation of receiving, by the communication module 51, a radio frequency power adjustment command message sent by a ZigBee router and corresponding to the ZigBee sensor includes: receiving a radio frequency power adjustment command message sent by the ZigBee router and corresponding to a moving state of the ZigBee sensor or a radio frequency power adjustment command message of a fixed state corresponding to the ZigBee sensor.

In an exemplary embodiment, in an application scenario of the embodiment of the present disclosure, the determination module 52 is further arranged to: set a first threshold according to the radio frequency power adjustment command message of the ZigBee sensor under a moving state; and set N levels of radio frequency power according to the value ranges of a radio frequency power with a maximum power value and a radio frequency power with a minimum power value, wherein N is a positive integer greater than or equal to 3.

Accordingly, the communication module 51 is further arranged to: send a power test request message of each level of radio frequency power determined by the determination module 52 to the ZigBee router; and receive a power test response message of each level of radio frequency power sent by the ZigBee router.

The determination module 52 is further arranged to: obtain an RSSI value of the power test request message of each level of radio frequency power according to the power test response message of each level of radio frequency power received by the communication module 51; determine a specific level of radio frequency power meeting conditions by using a dichotomy method and the first threshold according to the RSSI value of the power test request message of each level of radio frequency power; and determine the specific level of radio frequency power meeting conditions as a target radio frequency power of the ZigBee sensor under the moving state.

In an exemplary embodiment, in another application scenario of the embodiment of the present disclosure, the determination module 52 is further arranged to: set a second threshold according to the radio frequency power adjustment command message of the ZigBee sensor under a fixed state; and set M levels of radio frequency power according to the value ranges of a radio frequency power with a maximum power value and a radio frequency power with a minimum power value, wherein M is a positive integer greater than or equal to 3.

Accordingly, the communication module 51 is further arranged to: send a power test request message of each level of radio frequency power determined by the determination module 52 to the ZigBee router; and receive a power test response message of each level of radio frequency power sent by the ZigBee router.

The determination module 52 is further arranged to: obtain an RSSI value of the power test request message of each level of radio frequency power according to the power test response message of each level of radio frequency power received by the communication module 51; determine a specific level of radio frequency power meeting conditions by using a dichotomy method and the second threshold according to the RSSI value of the power test request message of each level of radio frequency power; and determine the specific level of radio frequency power meeting conditions as a target radio frequency power under the fixed state.

The ZigBee sensor in the present embodiment may be used to implement the technical solution shown in the foregoing method embodiment, the implementation principle and the technical effect are similar, and details are not described herein again.

In practical application, the communication module 51 and the determination module 52 may be implemented by devices such as a CPU, an MPU, a DSP, or an FPGA in the ZigBee sensor.

Figure 13:
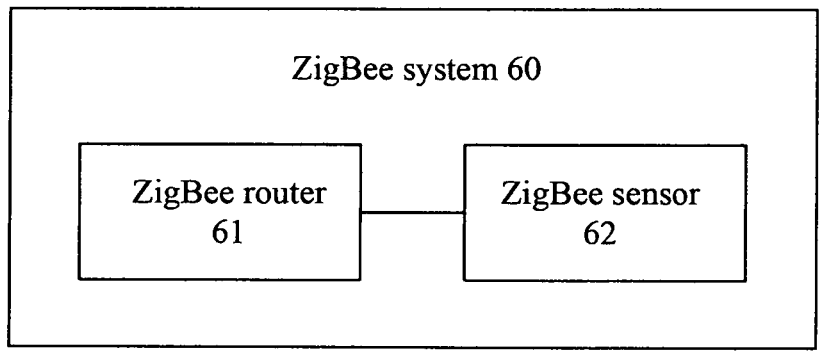
FIG. 13 is a structure schematic diagram of a ZigBee system according to an embodiment of the present disclosure.

FIG. 13 is a structure schematic diagram of a ZigBee system according to an embodiment of the present disclosure. As shown in FIG. 13, the ZigBee system 60 provided in the present embodiment may include: a ZigBee router 61 and a ZigBee sensor 62.

The ZigBee router 61 may be the ZigBee router according to any one of the above aspects in the foregoing embodiment.

The ZigBee sensor 62 may be the ZigBee sensor according to any one of the above aspects in the foregoing embodiment.

The ZigBee system in the present embodiment may be used to implement the technical solution shown in the foregoing method embodiment, the implementation principle and the technical effect are similar, and details are not described herein again.

Those skilled in the art will understand that the embodiments of the present disclosure may be provided as a method, system, or computer program product. Accordingly, the present disclosure may take the form of a hardware embodiment, a software embodiment, or a combination of software and hardware. Moreover, the present disclosure may take the form of a computer program product implemented on one or more computer available storage media (including, but not limited to, a disk memory, an optical memory, etc.) in which computer available program codes are included.

Those of ordinary skill in the art may understand that all or some of the steps of the above-mentioned embodiment may be implemented by using a computer program flow. The computer program may be stored in a computer-readable storage medium. The computer program is executed on a corresponding hardware platform (such as system, equipment, apparatus, and device). During execution, the computer program includes one of the steps of the method embodiment or a combination thereof.

In an exemplary embodiment, all or some of the steps of the above-mentioned embodiment may also be implemented by using an integrated circuit. These steps may be manufactured into integrated circuit modules respectively, or a plurality of modules or steps therein are manufactured into a single integrated circuit module.

The apparatus/functional module/function unit in the above-mentioned embodiment may be implemented by using a general computation apparatus. They may be centralized on a single computation apparatus or may be distributed in a network composed of a plurality of computation apparatuses.

When each apparatus/functional module/function unit in the above-mentioned embodiment is implemented in a form of a software function module and is sold or used as an independent product, the product may also be stored in a computer-readable storage medium. The above-mentioned computer-readable storage medium may be a read-only memory, a magnetic disk or an optical disk.

INDUSTRIAL APPLICABILITY

In the embodiments of the present disclosure, a ZigBee router and a ZigBee sensor are networked and connected; the ZigBee router receives multiple first data messages sent by the ZigBee sensor through a maximum radio frequency power within a first period; the ZigBee router acquires first RSSI values of the multiple first data messages, and determines a position state of the ZigBee sensor according to a fluctuation range of the multiple first RSSI values and the range of a first preset threshold; the ZigBee router receives a second data message sent by the ZigBee sensor through a maximum radio frequency power within a second period; the ZigBee router acquires a second RSSI value of the second data message, and determines, according to the ranges of the second RSSI value and the first RSSI values, an interval of the second RSSI value, so that the ZigBee router creates a radio frequency power adjustment command message corresponding to the ZigBee sensor according to a position state of the ZigBee sensor, and sends the created radio frequency power adjustment command message to the ZigBee sensor; the ZigBee sensor determines, according to the received radio frequency power adjustment command message, a target radio frequency power of the ZigBee sensor under a current position state, and sends a radio frequency power adjustment response message to the ZigBee router; and the ZigBee router determines a target radio frequency power, suitable for the ZigBee sensor, in a communication region according to the received radio frequency power adjustment response message. In the embodiments of the present disclosure, a ZigBee router automatically judges whether the position of a ZigBee sensor changes, and sends a corresponding radio frequency power adjustment command message to the ZigBee sensor according to the position state of the ZigBee sensor, and the ZigBee sensor adjusts a radio frequency power to an optimal mode according to the corresponding radio frequency power adjustment command message and feeds back the radio frequency power in the optimal mode to the ZigBee router, so that the ZigBee sensor communicates with the ZigBee router by using the radio frequency power in the optimal mode, thereby reducing the power consumption of the ZigBee sensor, prolonging the working period of the ZigBee sensor, and improving the working efficiency.

What is claimed is:

1. A method for adjusting a radio frequency power, applied to a ZigBee router, the method comprising:
determining a position state of a ZigBee sensor (step 110);
creating a radio frequency power adjustment command message corresponding to the ZigBee sensor according to the position state of the ZigBee sensor (step 120);
sending, to the ZigBee sensor, the radio frequency power adjustment command message corresponding to the ZigBee sensor (step 130); and
determining a target radio frequency power, suitable for the ZigBee sensor, in a communication region according to a radio frequency power adjustment response message received from the ZigBee sensor (step 140);
wherein determining a position state of a ZigBee sensor comprises:
receiving a plurality of first data messages sent by the ZigBee sensor within a first period (step 111);
acquiring first Received Signal Strength Indication (RSSI) values of the plurality of first data messages (step 112); and
determining the position state of the ZigBee sensor according to a fluctuation range of the plurality of first RSSI values and the range of a first preset threshold, and
wherein determining the position state of the ZigBee sensor according to the fluctuation range of the plurality of first RSSI values and the range of the first preset threshold comprises:
judging whether the fluctuation range of the plurality of first RSSI values is within the range of the first preset threshold (step 113):
determining, when it is determined that the fluctuation range of the plurality of first RSSI values is within the range of the first preset threshold, the position state of the ZigBee sensor as a fixed state (step 114); and
determining, when it is determined that the fluctuation range of the plurality of first RSSI values is not within the range of the first preset threshold, the position state of the ZigBee sensor as a moving state (step 115).

2. The method according to claim 1, wherein creating a radio frequency power adjustment command message corresponding to the ZigBee sensor according to the position state of the ZigBee sensor comprises:
creating, when the position state of the ZigBee sensor is a moving state, a radio frequency power adjustment command message of the moving state of the ZigBee sensor; and
creating, when the position state of the ZigBee sensor is a fixed state, a radio frequency power adjustment command message of the fixed state of the ZigBee sensor.

3. The method according to claim 1, wherein creating, when the position state of the ZigBee sensor is a moving state, a radio frequency power adjustment command message of the moving state of the ZigBee sensor comprises:
receiving a second data message sent by the ZigBee sensor within a second period (step 1211);
acquiring a second RSSI value of the second data message (step 1212);
dividing the communication region into a plurality of first intervals according to the plurality of first RSSI values, each first interval corresponding to the range of a different first RSSI value (step 1213);
determining, according to the second RSSI value and the ranges of different first RSSI values, a second interval of the second RSSI value in each first interval (step 1214);
creating a radio frequency power adjustment command message of the moving state of the ZigBee sensor in each second interval (step 1215); or
creating, when the position state of the ZigBee sensor is a fixed state, a radio frequency power adjustment command message corresponding to the fixed state of the ZigBee sensor comprises:
receiving a second data message sent by the ZigBee sensor within a second period (step 1221);
acquiring a second RSSI value of the second data message (step 1222);
dividing the communication region into a third interval according to the plurality of first RSSI values, the third interval corresponding to the range of all first RSSI values (step 1223);
determining that, according to the second RSSI value and the range of all first RSSI values, the second RSSI value is in the third interval (step 1224); and
creating a radio frequency power adjustment command message of the fixed state of the ZigBee sensor in the third interval (step 1225).

4. The method according to claim 3, wherein sending, to the ZigBee sensor, the radio frequency power adjustment command message corresponding to the ZigBee sensor comprises:
sending, when the position state of the ZigBee sensor is a moving state, a radio frequency power adjustment command message of the moving state of the ZigBee sensor in each second interval to the ZigBee sensor; and
sending, when the position state of the ZigBee sensor is a fixed state, a radio frequency power adjustment command message of the fixed state of the ZigBee sensor in the third interval to the ZigBee sensor.

5. The method according to claim 3, wherein after sending, to the ZigBee sensor, the radio frequency power adjustment command message corresponding to the ZigBee sensor, the method further comprises:
receiving a power test request message of each level of radio frequency power sent by the ZigBee sensor (step 131);
obtaining an RSSI value of the power test request message of each level of radio frequency power according to the power test request message of each level of radio frequency power (step 132);
encapsulating the RSSI value of the power test request message of each level of radio frequency power into a power test response message of each level of radio frequency power (step 133); and
sending the power test response message of each level of radio frequency power to the ZigBee sensor (step 134),
wherein determining a target radio frequency power, suitable for the ZigBee sensor, in a communication region according to a radio frequency power adjustment response message received from the ZigBee sensor comprises:

receiving the radio frequency power adjustment response message sent by the ZigBee sensor;

obtaining, when the position state of the ZigBee sensor is a moving state, a target radio frequency power of each second interval according to the radio frequency power adjustment response message, selecting a target radio frequency power with a maximum power value from the target radio frequency power of each second interval, and determining the selected target radio frequency power with the maximum power value as a target radio frequency power of the ZigBee sensor in the communication region; and obtaining, when the position state of the ZigBee sensor is a fixed state, the target radio frequency power according to the radio frequency power adjustment response message, and determining the target radio frequency power as a target radio frequency power of the ZigBee sensor in the communication region.

6. A method for adjusting a radio frequency power, applied to a ZigBee sensor, the method comprising:

receiving a radio frequency power adjustment command message sent by a ZigBee router and corresponding to the ZigBee sensor;

determining, according to the received radio frequency power adjustment command message, a target radio frequency power of the ZigBee sensor under a current position state; and sending, to the ZigBee router, a radio frequency power adjustment response message carrying the target radio frequency power of the ZigBee sensor under the current position state, wherein before receiving a radio frequency power adjustment command message sent by a ZigBee router and corresponding to the ZigBee sensor, the method further comprises: sending a plurality of first data messages to the ZigBee router within a first period, and wherein in a case that a fluctuation range of first Received Signal Strength Indication (RSSI) values of the plurality of first data messages is within a range of a first preset threshold, the current position state of the ZigBee sensor is a fixed state and in a case that the fluctuation range of the first RSSI values of the plurality of first data messages is not within the range of the first preset threshold, the current position state of the ZigBee sensor is a moving state.

7. The method according to claim 6, wherein after sending a plurality of first data messages to the ZigBee router within a first period, the method further comprises:

sending a second data message to the ZigBee router within a second period.

8. The method according to claim 6, wherein receiving a radio frequency power adjustment command message sent by a ZigBee router and corresponding to the ZigBee sensor comprises:

receiving a radio frequency power adjustment command message sent by the ZigBee router and corresponding to the moving state of the ZigBee sensor or a radio frequency power adjustment command message of the fixed state corresponding to the ZigBee sensor, wherein determining, according to the radio frequency power adjustment command message, a target radio frequency power of the ZigBee sensor under a current position state comprises:

setting a first threshold according to the radio frequency power adjustment command message of the ZigBee sensor under the moving state (step 2211);

setting N levels of radio frequency power according to value ranges of a radio frequency power with a maximum power value and a radio frequency power with a minimum power value (step 2212), wherein N is a positive integer greater than or equal to 3;

sending a power test request message of each level of radio frequency power to the ZigBee router (step 2213);

receiving a power test response message of each level of radio frequency power sent by the ZigBee router (step 2214);

obtaining a RSSI value of the power test request message of each level of radio frequency power according to the power test response message of each level of radio frequency power (step 2215);

determining a specific level of radio frequency power meeting conditions by using a dichotomy method and the first threshold according to the RSSI value of the power test request message of each level of radio frequency power (step 2216);

determining the specific level of radio frequency power meeting conditions as a target radio frequency power of the ZigBee sensor under the moving state (step 2217); or setting a second threshold according to the radio frequency power adjustment command message of the ZigBee sensor under the fixed state (step 2221);

setting M levels of radio frequency power according to value ranges of a radio frequency power with a maximum power value and a radio frequency power with a minimum power value (step 2222), wherein M is a positive integer greater than or equal to 3;

sending a power test request message of each level of radio frequency power to the ZigBee router (step 2223);

receiving a power test response message of each level of radio frequency power sent by the ZigBee router (step 2224);

obtaining an RSSI value of the power test request message of each level of radio frequency power according to the power test response message of each level of radio frequency power (step 2225);

determining a specific level of radio frequency power meeting conditions by using a dichotomy method and the second threshold according to the RSSI value of the power test request message of each level of radio frequency power (step 2226); and determining the specific level of radio frequency power meeting conditions as a target radio frequency power of the ZigBee sensor under the fixed state (step 2227).

9. A ZigBee muter, comprising a computer processor and a computer-readable storage medium where stores computer-executcible instructions, wherein the computer-executable instructions, when being read by the computer processor, cause the computer processor to:

determine a position state of a ZigBee sensor;

create a radio frequency power adjustment command message corresponding to the ZigBee sensor according to the position state of the ZigBee sensor determined by the determination module;

send, to the ZigBee sensor, the radio frequency power adjustment command message created by the creation module and corresponding to the ZigBee sensor; and determine a target radio frequency power, suitable for the ZigBee sensor, in a communication region according to a radio frequency power adjustment response message received by the communication module from the ZigBee sensor, wherein the computer-executable instructions, when being read by the computer processor, further cause the computer processor to:
receive a plurality of first data messages sent by the ZigBee sensor within a first period; and
acquire first Received Signal Strength Indication (RSSI) values of the plurality of first data messages received by the communication module; and
determine the position state of the ZigBee sensor according to a fluctuation range of the plurality of first RSSI values and the range of a first preset threshold, and wherein the operation of determining, the position state of the ZigBee sensor according to the fluctuation range of the plurality of first RSSI values and the range of the first preset threshold comprises:
judging whether the fluctuation range of the plurality of first RSSI values is within the range of the first preset threshold:
determining, when it is determined that the fluctuation range of the plurality of first RSSI values is within the range of the first preset threshold, the position state of the ZigBee sensor as a fixed state; and
determining, when it is determined that the fluctuation range of the plurality of first RSSI values is not within the range of the first preset threshold, the position state of the ZigBee sensor as a moving state.

10. The router according to claim 9, wherein the computer-executable instructions, when being read by the computer processor, further cause the computer processor to:
create, when the position state of the ZigBee sensor is a moving state, a radio frequency power adjustment command message of the moving state of the ZigBee sensor; and
create, when the position state of the ZigBee sensor is a fixed state, a radio frequency power adjustment command message of the fixed state of the ZigBee sensor.

11. The router according to claim 9, wherein the computer-executable instructions, when being read by the computer processor, further cause the computer processor to:
receive a second data message sent by the ZigBee sensor within a second period;
acquire a second RSSI value of the second data message received by the communication module; divide the communication region into a plurality of first intervals according to the plurality of first RSSI values, each first interval corresponding to the range of a different first RSSI value; and determine, according to the second RSSI value and the ranges of different first RSSI values, a second interval of the second RSSI value in each first interval;
acquire a second RSSI value of the second data message; divide the communication region into a third interval according to the plurality of first RSSI values, the third interval corresponding to the range of all first RSSI values; and determine that, according to the second RSSI value and the range of the first RSSI values, the second RSSI value is in the third interval; and
create a radio frequency power adjustment command message of the moving state of the ZigBee sensor in each second interval; or, create a radio frequency power adjustment command message of the fixed state of the ZigBee sensor in the third interval.

12. The router according to claim 11, wherein the operation of sending the radio frequency power adjustment command message corresponding to the ZigBee sensor to the ZigBee sensor comprises:
sending, when the position state of the ZigBee sensor is a moving state, a radio frequency power adjustment command message of the moving state of the ZigBee sensor in each second interval to the ZigBee sensor; and
sending, when the position state of the ZigBee sensor is a fixed state, a radio frequency power adjustment command message of the fixed state of the ZigBee sensor in the third interval to the ZigBee sensor.

13. The router according to claim 11, wherein the computer-executable instructions, when being read by the computer processor, further cause the computer processor to:
receive a power test request message of each level of radio frequency power sent by the ZigBee sensor;
obtain an RSSI value of the power test request message of each level of radio frequency power according to the power test request message of each level of radio frequency power received by the communication module, and encapsulate the RSSI value of the power test request message of each level of radio frequency power into a power test response message of each level of radio frequency power;
send the power test response message of each level of radio frequency power, obtained by the creation module, to the ZigBee sensor;
receive the radio frequency power adjustment response message sent by the ZigBee sensor;
obtain, when the position state of the ZigBee sensor is a moving state, a target radio frequency power of each second interval according to the radio frequency power adjustment response message received by the communication module, select a target radio frequency power with a maximum power value from the target radio frequency power of each second interval, and determine the selected target radio frequency power with the maximum power value as a target radio frequency power of the ZigBee sensor in the communication region; and
obtain, when the position state of the ZigBee sensor is a fixed state, the target radio frequency power according to the radio frequency power adjustment response message received by the communication module, and determine the target radio frequency power as a target radio frequency power of the ZigBee sensor in the communication region.

14. A ZigBee sensor, comprising a computer processor and a computer-readable storage medium where stores computer-executable instructions, wherein the computer-executable instructions, when being read by the computer processor, cause the computer processor to:
receive a radio frequency power adjustment command message sent by a ZigBee router and corresponding to the ZigBee sensor;
determine, according to the received radio frequency power adjustment command message received by the communication module, a target radio frequency power of the ZigBee sensor under a current position state; and
send, to the ZigBee router, a radio frequency power adjustment response message carrying the target radio frequency power of the ZigBee sensor under the current position state, determined by the determination module, wherein the computer-executable instructions, when being read by the computer processor, further cause the computer processor to: send a plurality of first data messages to the ZigBee router within a first period, and wherein in a case that a fluctuation range of first Received Signal Strength Indication (RSSI) values of the plurality of first data messages is within a range of a first preset threshold, the current position state of the ZigBee sensor is a fixed state and in a case that the fluctuation range of the first RSSI values of the plurality of first data messages is not within the range of the first preset threshold, the current position state of the ZigBee sensor is a moving state.

15. The sensor according to claim 14, wherein the computer-executable instructions, when being read by the computer processor, further cause the computer processor to send a second data message to the ZigBee router within a second period.

16. The sensor according to claim 14, wherein the operation of receiving a radio frequency power adjustment command message sent by a ZigBee router and corresponding to the ZigBee sensor comprises:

receiving a radio frequency power adjustment command message sent by the ZigBee router and corresponding to the moving state of the ZigBee sensor or a radio frequency power adjustment command message of the fixed state corresponding to the ZigBee sensor, wherein the computer-executable instructions, when being read by the computer processor, further cause the computer processor to:

set a first threshold according to the radio frequency power adjustment command message of the ZigBee sensor under the moving state; and set N levels of radio frequency power according to value ranges of a radio frequency power with a maximum power value and a radio frequency power with a minimum power value, wherein N is a positive integer greater than or equal to 3;

send a power test request message of each level of radio frequency power determined by the determination module to the ZigBee router; and receive a power test response message of each level of radio frequency power sent by the ZigBee router;

obtain a RSSI value of the power test request message of each level of radio frequency power according to the power test response message of each level of radio frequency power received by the communication module; determine a specific level of radio frequency power meeting conditions by using a dichotomy method and the first threshold according to the RSSI value of the power test request message of each level of radio frequency power;

determine the specific level of radio frequency power meeting conditions as a target radio frequency power of the ZigBee sensor under the moving state; or set a second threshold according to the radio frequency power adjustment command message of the ZigBee sensor under the fixed state; and set M levels of radio frequency power according to value ranges of a radio frequency power with a maximum power value and a radio frequency power with a minimum power value, wherein M is a positive integer greater than or equal to 3;

send a power test request message of each level of radio frequency power determined by the determination module to the ZigBee router; and receive a power test response message of each level of radio frequency power sent by the ZigBee router;

obtain an RSSI value of the power test request message of each level of radio frequency power according to the power test response message of each level of radio frequency power received by the communication module;

determine a specific level of radio frequency power meeting conditions by using a dichotomy method and the second threshold according to the RSSI value of the power test request message of each level of radio frequency power; and determine the specific level of radio frequency power meeting conditions as a target radio frequency power of the ZigBee sensor under the fixed state.

* * * * *